(12) United States Patent  
Dempsey et al.

(10) Patent No.: US 7,789,452 B2
(45) Date of Patent: Sep. 7, 2010

(54) RECONFIGURABLE TRAVEL TRAILER

(75) Inventors: Thomas M. Dempsey, Cedar Mountain, NC (US); Gregory K. Mundt, Duluth, GA (US); Thomas W. Reeder, Fletcher, NC (US)

(73) Assignee: Sylvansport, LLC, Cedar Mountain, NC (US)

( * ) Notice: Subject to any disclaimer, the term of this patent is extended or adjusted under 35 U.S.C. 154(b) by 136 days.

(21) Appl. No.: 12/215,358

(22) Filed: Jun. 26, 2008

(65) Prior Publication Data

US 2009/0007948 A1 Jan. 8, 2009

Related U.S. Application Data

(63) Continuation-in-part of application No. 11/890,445, filed on Aug. 6, 2007.

(60) Provisional application No. 60/946,885, filed on Jun. 28, 2007.

(51) Int. Cl.
*B60P 3/355* (2006.01)
(52) U.S. Cl. ........................ 296/173; 296/169
(58) Field of Classification Search ........... 296/173, 296/156, 159, 160, 165, 168, 169, 171; 280/63, 280/656
See application file for complete search history.

(56) References Cited

U.S. PATENT DOCUMENTS

| | | | |
|---|---|---|---|
| 1,422,498 A | | 7/1922 | Vint |
| 1,461,574 A | * | 7/1923 | Caplan .................. 296/169 |
| 1,477,111 A | | 12/1923 | Eaton |
| 1,564,257 A | * | 12/1925 | Lippman ............... 296/169 |
| 1,568,895 A | | 1/1926 | Lyons |
| 1,696,924 A | | 8/1926 | Curtis |
| 1,826,480 A | | 10/1931 | Rappich |
| 1,857,081 A | * | 5/1932 | Fontaine .............. 296/169 |
| 2,076,486 A | | 4/1937 | Watt |
| 2,155,582 A | * | 4/1939 | Bond .................... 296/169 |
| 2,912,274 A | * | 11/1959 | Falkner ................ 296/172 |
| 3,194,251 A | * | 7/1965 | Pettersen ............. 296/163 |
| 3,488,085 A | * | 1/1970 | Wallace ............... 296/168 |
| 3,489,428 A | * | 1/1970 | Hunter et al. ......... 280/765.1 |
| 3,514,150 A | | 5/1970 | Wallace |
| 3,608,953 A | * | 9/1971 | Bernard .............. 296/169 |
| 3,623,762 A | | 11/1971 | Fagan |
| 3,625,542 A | * | 12/1971 | Curtis ................. 280/766.1 |
| 3,658,375 A | | 4/1972 | Bowen |
| 3,697,122 A | | 10/1972 | Richards |
| 3,737,190 A | | 6/1973 | Smith |
| 3,917,337 A | | 11/1975 | Couix |
| 4,017,116 A | | 4/1977 | Hulsey |
| 4,113,301 A | | 9/1978 | Olmstead |
| 4,187,636 A | | 2/1980 | Pauly |
| 4,310,195 A | | 1/1982 | Huff |

(Continued)

OTHER PUBLICATIONS

U.S. Appl. No. 29/281,681 for "Trailer", Dempsey et al., filed Jun. 28, 2007, (13 pages).

(Continued)

*Primary Examiner*—Kiran B. Patel
(74) *Attorney, Agent, or Firm*—J. Bennett Mullinax, LLC

(57) ABSTRACT

A travel trailer is provided. The travel trailer may include a camping pod that contains tent fabric. The travel trailer may also have a telescoping member that is configured for raising and lowering the camping pod.

6 Claims, 22 Drawing Sheets

U.S. PATENT DOCUMENTS

| | | | |
|---|---|---|---|
| 5,135,278 A * | 8/1992 | Kauffman et al. | 296/170 |
| 5,211,413 A | 5/1993 | Williams | |
| 5,449,014 A | 9/1995 | Yan-ho | |
| 5,505,515 A | 4/1996 | Turner | |
| 5,558,392 A | 9/1996 | Young | |
| 5,921,616 A * | 7/1999 | Hall et al. | 296/168 |
| 5,979,972 A * | 11/1999 | Gehman | 296/173 |
| 6,017,081 A | 1/2000 | Colby | |
| 6,135,526 A | 10/2000 | Reckner, Jr. | |
| 6,203,097 B1 | 3/2001 | Podgorney | |
| 6,206,456 B1 | 3/2001 | Steury | |
| 6,217,106 B1 | 4/2001 | Reckner, Jr. | |
| 6,283,536 B1 | 9/2001 | Muzyka | |
| 6,712,414 B2 | 3/2004 | Morrow | |
| 6,722,726 B1 | 4/2004 | Parmer | |
| 7,014,238 B2 | 3/2006 | Gonzalez | |
| 7,017,975 B2 | 3/2006 | Parmer | |
| 7,032,956 B2 | 4/2006 | Gehman et al. | |
| 7,165,779 B2 | 1/2007 | Badger et al. | |
| 7,178,857 B2 | 2/2007 | Williams | |
| 7,246,843 B2 | 7/2007 | Lambright | |
| 7,322,637 B2 | 1/2008 | Smith | |
| 7,380,867 B2 | 6/2008 | Waas | |
| 2005/0247747 A1 * | 11/2005 | Henry et al. | 224/401 |
| 2006/0208462 A1 * | 9/2006 | Spence | 280/656 |
| 2007/0125410 A1 | 6/2007 | Williams | |
| 2008/0122197 A1 | 5/2008 | Spence | |

OTHER PUBLICATIONS

U.S. Appl. No. 29/281,682 for "Trailer", Dempsey et al., filed Jun. 28, 2007, (13 pages).

U.S. Appl. No. 29/281,685 for "Trailer", Dempsey et al., filed Jun. 28, 2007, (13 pages).

U.S. Appl. No. 11/890,445 for "Reconfigurable Travel Trailer", Dempsey et al., filed Aug. 6, 2007, (39 pages).

Jumping Jack Trailers; Web site print outs from www.jumpingjacktrailers.com; visited Oct. 29, 2008; copyright 2008 Jumping Jacic Trailers; (4 pages).

Goshen Stamping Co. Inc.; Web site print outs from www.goshenstamping.com; visited Oct. 29, 2008; copyright Goshen Stamping Co. Inc.; (4 pages).

International Search Report and Written Opinion of the International Searching Authority; International Application No. PCT/US2008/007997; mailing date Oct. 2, 2008; (8 pages).

United States Patent and Trademark Office; Office Action from U.S. Appl. No. 11/890,445; mailed Aug. 6, 2007; Alexandria, Virginia; pp. 1-6 (6 pages).

* cited by examiner

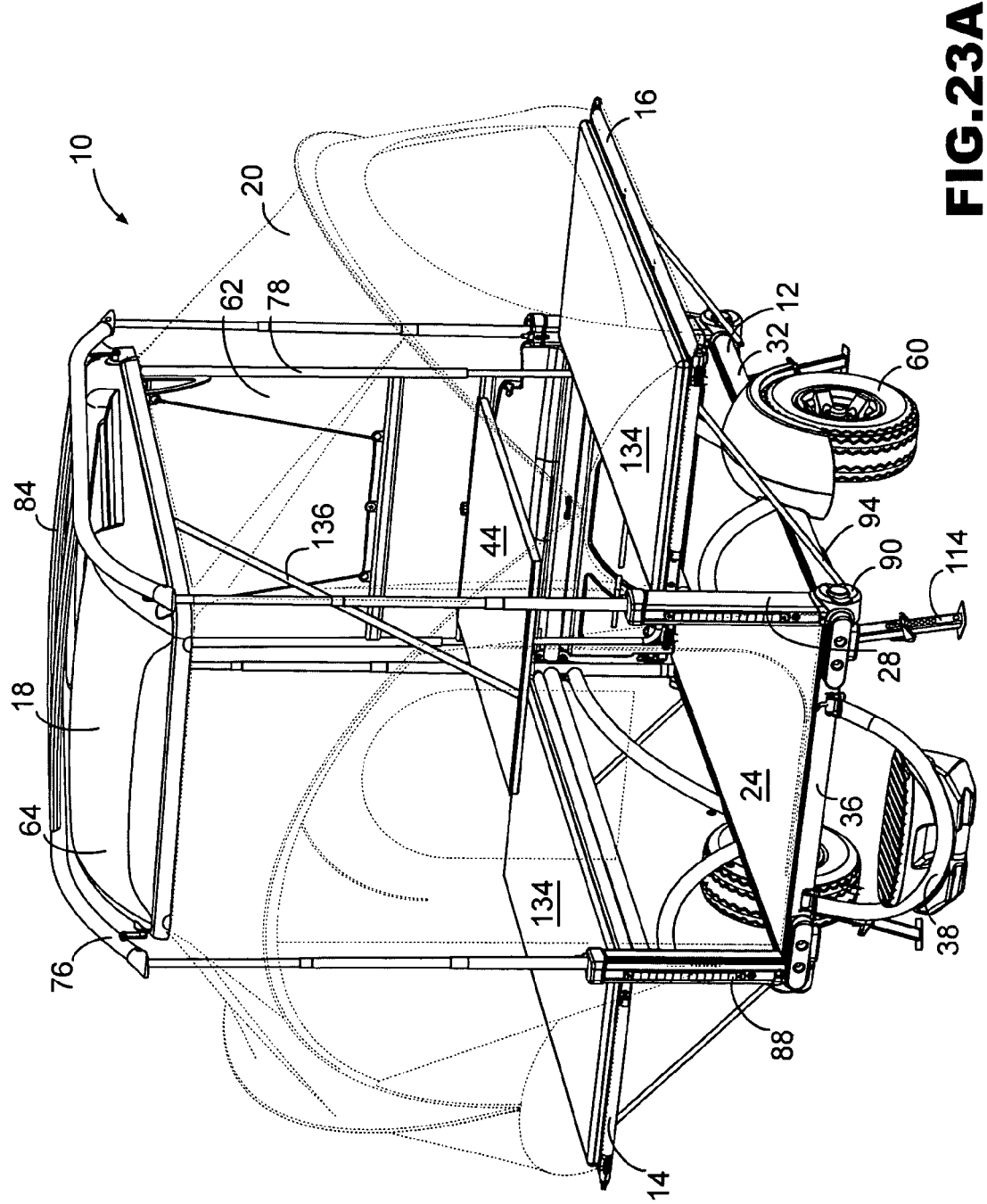

RECONFIGURABLE TRAVEL TRAILER

CROSS REFERENCE TO RELATED APPLICATIONS

This application is a continuation-in-part and claims the benefit of U.S. application Ser. No. 11/890,445 filed on Aug. 6, 2007 and entitled, "Reconfigurable Travel Trailer." U.S. application Ser. No. 11/890,445 claims the benefit of U.S. Application Ser. No. 60/946,885 filed on Jun. 28, 2007 and entitled, "Reconfigurable Vehicle." The present application also claims the benefit of U.S. Application Ser. No. 60/946,885. U.S. application Ser. Nos. 60/946,885 and 11/890,445 are both incorporated by reference herein in their entireties for all purposes.

FIELD OF THE INVENTION

The present invention relates generally to travel trailers. More particularly, the present application involves a travel trailer that can be towed in a travel configuration and then converted into a transport configuration for use in transporting an object. The travel trailer can also be converted into a camping configuration in which a tent is formed for use when camping.

BACKGROUND

Travel trailers are available in many types, shapes and sizes, and are typically dedicated for a single purpose. Trailers with flat beds are used for hauling cargo from building materials to furniture. They are generally topless and suited with a perimeter fence, or completely closed with an access door to retain their cargo. Trailers equipped with a flat bed or rails are normally used for transport of recreational vehicles such as all terrain vehicles, motorcycles, watercraft, bicycles or the like. There are trailers outfitted with camper modules, some of which, while incapable of carrying any substantial load, are capable of being converted from a transport trailer to a camper. A further division or class of camper trailer is the pop-up tent camper. These camper trailers are generally constructed of mild steel panels that can be articulated to a vertically expanded position, or popped up, and in combination with an internal tent fabric that acts in concert with the steel panels, reconfigures into a camper environment. Due to a general lack of applied engineering techniques, material selection such as mild steel and multiple gussets for structural stability causes the finished product to be overly weighty and cumbersome.

Lack of adaptability of travel trailers may be problematic if a user wishes to carry an object, such as an all terrain vehicle or a motorcycle, along with a camper. In these instances, one such option may be to use a truck for the tow vehicle that has a truck bed capable of accommodating the desired object. Further, if there are more than two passengers, the trip necessitates the use of a truck with an extended cab to provide greater passenger capacity. With regard to rafting, kayaking or other aquatic activities where there is an embarkation point and a debarkation point, a transport vehicle may be desirable at journeys end for return to the origination point. A travel trailer that allows one to trailer a light motor vehicle to the take out point, drop off the transportation, and return to the start point for a river experience without worry or concern over transportation arrangements may be desirable.

Some travel trailers may also be manufactured so as to be price competitive with little or no regard to curb weight. These types of travel trailers are fabricated for the most part, from less expensive materials, such as off-the-shelf mild steel, as opposed to proprietary custom shapes of more expensive non-corrosive lighter materials like aluminum. Any perceived savings from the initial purchase is quickly vanquished; initially by the requirement of a tow vehicle with a suitable tow package. A tow package, which generally consists of a heavier duty transmission, frame and suspension, can increase the expenditure for the prime mover by many hundreds, if not thousands of dollars. Use of a motorcycle as a tow vehicle is not an option. Additionally, this increased weight, for the trailer and the tow vehicle, adversely affects the miles per gallon of fuel, again increasing the cost of the camping experience. Often, after detaching the trailer from the hitch, it is desirable to reposition the trailer and roll it manually to a more desirable location. Depending on terrain and topography, this operation may require more than one person.

Trailers built expressly for towing loads, especially in the form of wheeled vehicles, may be suited with a tilt capacity, or come with a ramp for on or offloading cargo while the trailer is still attached to the tow vehicle. Camper trailers are not intended to carry vehicles within and therefore are not available with a tilt option. Further, pop-up tent campers which unfold to provide sleeping surfaces do so by expanding forward and backward. As such, camper trailers may need to be removed from the towing vehicle in order to be tilted or to expand in order to construct sleeping and living quarters.

With regard to pop-up tent campers, the upper structure is not typically suited to support or carry a load. Carrying additional cargo may necessitate other transport capabilities for which the pop-up camper is not structurally suited to accommodate. One common answer for this problem is attachment of a roof rack for such cargo as kayaks or light articles, which must be placed atop the towing vehicle. This placement puts the cargo out of the driver's sight casting doubt and concern as to how securely the cargo is attached, especially at highway speeds. This high placement atop the vehicle causes additional problems in handling, due to a raised center of gravity coupled with wind resistance, which adversely affects the control and steering characteristics of the tow vehicle. A further disadvantage of this high placement is the difficulty of on or offloading the cargo from an uncomfortable lifting height.

As such, there remains room for variation and improvement within the art.

SUMMARY

Various features of the invention will be set forth in part in the following description, or may be obvious from the description, or may be learned from practice of the invention.

One aspect of one exemplary embodiment provides for a travel trailer that has a camping pod that contains tent fabric. A telescoping member may also be present that is configured for raising and lowering the camping pod.

Another aspect of an additional exemplary embodiment is provided in a tent that has a camping pod that at least partially forms a wall of the tent and that at least partially forms a top of the tent. Tent fabric is also present that at least partially forms at least two walls of the tent.

A further aspect of an alternative exemplary embodiment is found in a tent that has a camping pod and tent fabric. The tent fabric is deployed downward from the camping pod into position so as to at least partially form at least one side wall of the tent.

Another aspect of an additional exemplary embodiment is provided in a camping pod that has a first wall and a second wall that are configured for being moved relative to one another. The first wall and the second wall may be configured to be attached to a trailer and detached from the trailer. When attached to the trailer, the first wall and the second wall may be capable of being reoriented on the trailer from a travel configuration to a camping configuration.

A still further aspect of another exemplary embodiment is provided in a travel trailer that has a frame with a floor and a bed panel. A camping pod is also present and is configured to be attached to and removed from the travel trailer. The camping pod is configured to be attached to the travel trailer and be reconfigurable between a travel configuration, a transport configuration, and a camping configuration. The camping pod is closer to the floor when in the travel configuration than when in the transport configuration. The bed panel is reconfigurable between a travel configuration and a transport configuration when the camping pod is removed from the travel trailer.

These and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which:

FIG. 23A is a perspective view of the interior of the travel trailer of FIG. 21 in which a table and bed panels with air mattresses are arranged.

Figure 1:
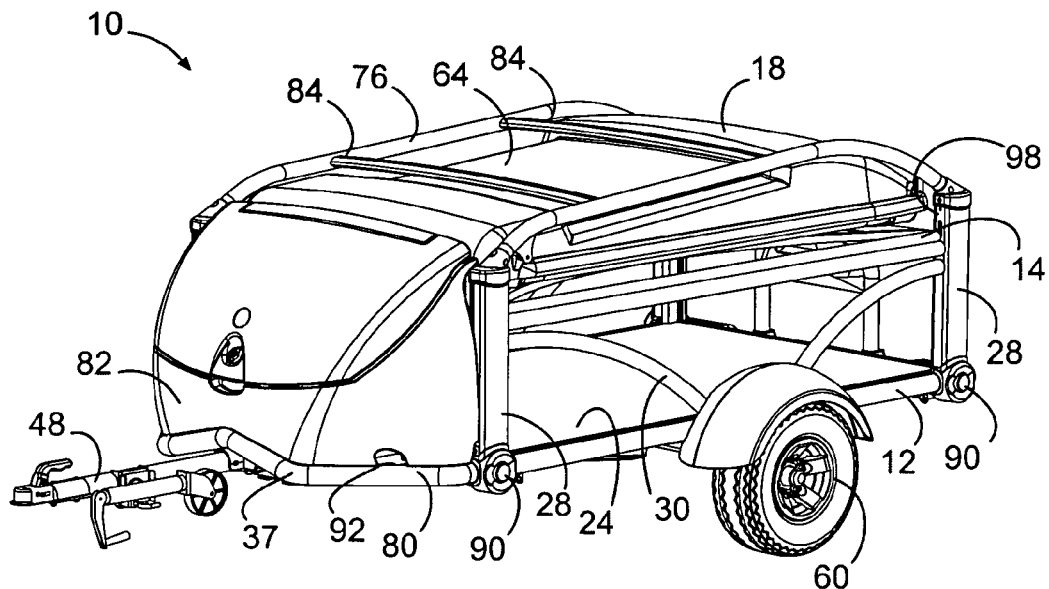
FIG. 1 is a perspective view of a travel trailer in a travel configuration in accordance with one exemplary embodiment.
Figure 2:
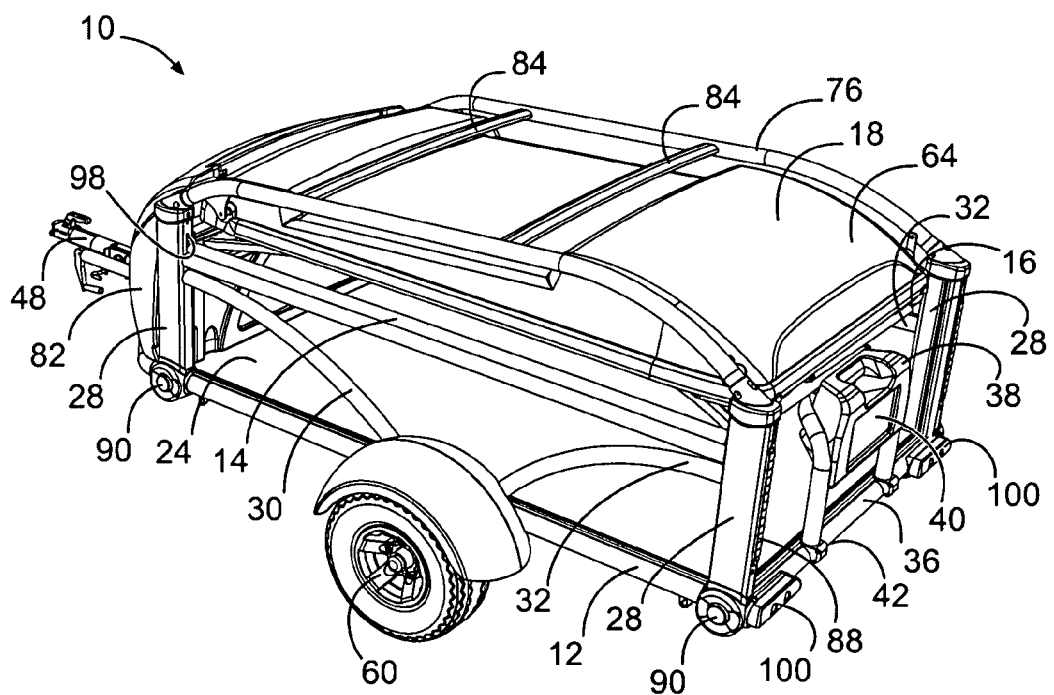
FIG. 2 is a back perspective view of the travel trailer of FIG. 1.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for a travel trailer 10 that can be used for camping and for transporting objects. In accordance with one exemplary embodiment, the travel trailer 10 can be placed into a travel configuration for transport by a vehicle to a desired location. Additionally, the travel trailer 10 can be converted into a transport configuration in which it becomes capable of transporting an object 58 such as an all terrain vehicle. In certain embodiments the travel trailer 10 can be provided with a hinge connection 50 in order to allow a portion of the travel trailer 10 to tilt so as to more easily load and unload objects 58. The travel trailer 10 may also be placed into a camping configuration in which a tent 22 is formed on the travel trailer 10 for shelter during camping. The travel trailer 10 can be constructed to be relatively lightweight with a low center of gravity to provide stability during transport and reduce wind resistance to conserve gas mileage and improve handling.

One exemplary embodiment of the travel trailer 10 is shown in FIG. 1. Here, the travel trailer 10 is shown in a travel configuration in which it is positioned in order to be transported by a vehicle (not shown) to a desired location. The travel trailer 10 can be sized and configured so that it is capable of being transported by a variety of vehicles such as trucks, sport utility vehicles, cars and motorcycles. The travel trailer 10 includes a hitch 48 for attachment to a tow ball of a vehicle for transport. The hitch 48 may be a trailer hitch provided by Knott Brake Company having offices located at 144 West Drive, Lodi, Ohio, USA. This hitch 48 can be modified to fit a two inch tow ball that is commonly found on highway vehicles. The hitch 48 includes an arm that can be lowered in order to provide support to the front of the travel trailer 10 when not attached to the towing vehicle. Other forms of engagement between the vehicle and travel trailer 10 are also possible. For example, the travel trailer 10 can have a hitch 48 that is inserted into a trailer hitch receiver of a vehicle, or the travel trailer 10 may be chained to or otherwise secured to the transporting vehicle. The hitch 48 may sometimes be referred to as a tongue. As such, it is to be understood that as used herein, the term "hitch" means a "tongue" of the travel trailer 10 and the hitch 48 can have a meaning that is broader than, more restrictive than, or the same in scope as the term "tongue."

FIGS. 2 through 6 are various views of the travel trailer 10 of FIG. 1 in the travel configuration. The travel trailer 10 has a frame 12 that includes a front portion 80 that supports a front storage box 82. The front storage box 82 may be made out of plastic in order to reduce the weight of the travel trailer 10 and hence increase fuel efficiency of the vehicle towing same. The front storage box 82 has a cover that can be opened in order to store items therein and remove items therefrom. A locking type hinge may be incorporated into the front storage box 82. The hinge position of the front storage box 82 is at the top of the front storage box 82 so that upon opening, the cover moves upwards and towards the rear of the travel trailer 10. The front storage box 82 may include two plastic pieces that are joined in such a manner that a separate hinge component is not needed. In this regard, the cover of the front storage box 82 is provided with a bayonet type member that fits within a receiving member on the lower portion of the front storage box 82. These two parts can pivot with respect to one another without the need for a separate hinge component to allow for opening and closing of the front storage box 82. A vice action compression latch provided by Southco® having offices at 210 N. Brinton Lake Rd, Concordville, Pa., USA can be included in order to provide a mechanism for opening, closing and locking the front storage box 82. The front storage box 82 is thus lockable and can be insulated in order to prevent heat transfer to or from items housed within. A drain plug can be provided in the bottom of the front storage box 82 in order to drain water therefrom. Further, various tools that may be used to reconfigure the travel trailer 10 can be stored in the front storage box 82 and may be placed into special compartments formed therein.

The frame 12 supports a floor 24 that has a generally rectangular shape. The floor 24 can be a solid component or may be a grate or other non-solid member. In accordance with one exemplary embodiment, the floor 24 includes a series of flanged c-channel cross members that extend between first and second side frame components 30 and 32 on either side of the frame 12. The floor 24 has a solid section that rests on top of the c-channel cross members to provide a surface onto which objects may be located and transported by the travel trailer 10. The cross-members and solid section of the floor 24 may be attached to one another through welding. The aforementioned components of the floor 24 can be made out of aluminum in accordance with one exemplary embodiment in order to impart lightweight properties to the travel trailer 10 while still providing sufficient support strength thereto. Any number of cross-members may be incorporated into the floor 24. For example, from five to ten cross-members may be used in certain exemplary embodiments.

The frame 12 has vertical corner posts 28 located generally at the four corners of the floor 24. The vertical corner posts 28 can be made of extruded aluminum in accordance with one exemplary embodiment. The frame 12 also has a first side frame component 30 and a second side frame component 32. The side frame components 30 and 32 are made of an open framework so that wind resistance is reduced during transport of the travel trailer 10. Further, the open framework of the side frame components 30 and 32 functions to reduce the weight of the travel trailer 10. The side frame components 30 and 32 may have a circular cross-sectional shape and can be made of aluminum for further weight reduction benefits. Portions of the side frame components 30 and 32 extend in a generally curved manner between the wheels 60 and the vertical corner posts 28. Other portions of the side frame components 30 and 32 are relatively straight in the forward and backward direction of the travel trailer 10.

Figure 3:
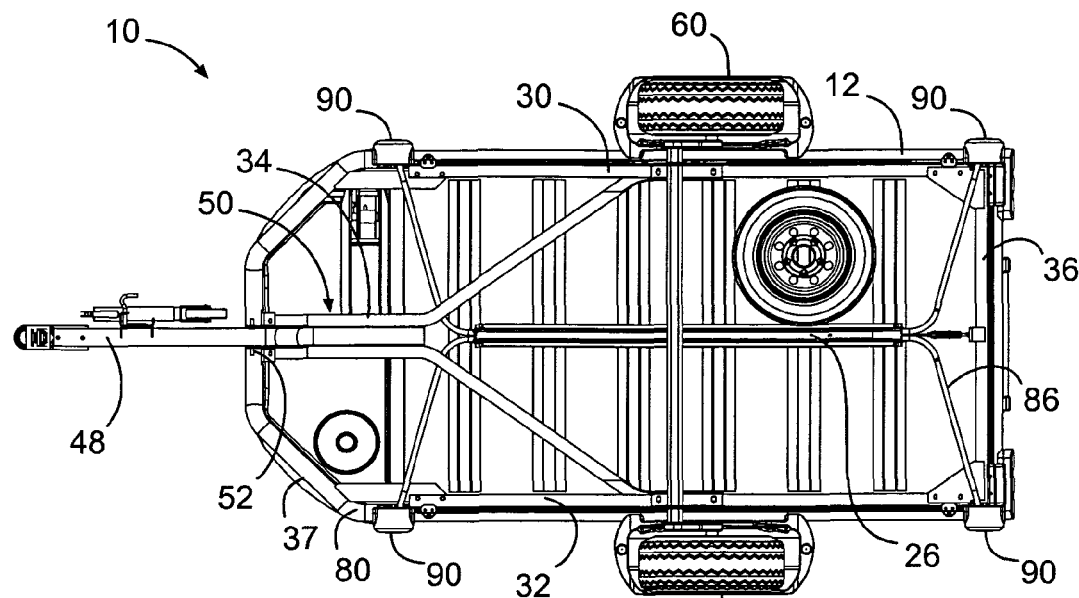
FIG. 3 is a bottom view of the travel trailer of FIG. 1.
Figure 4:
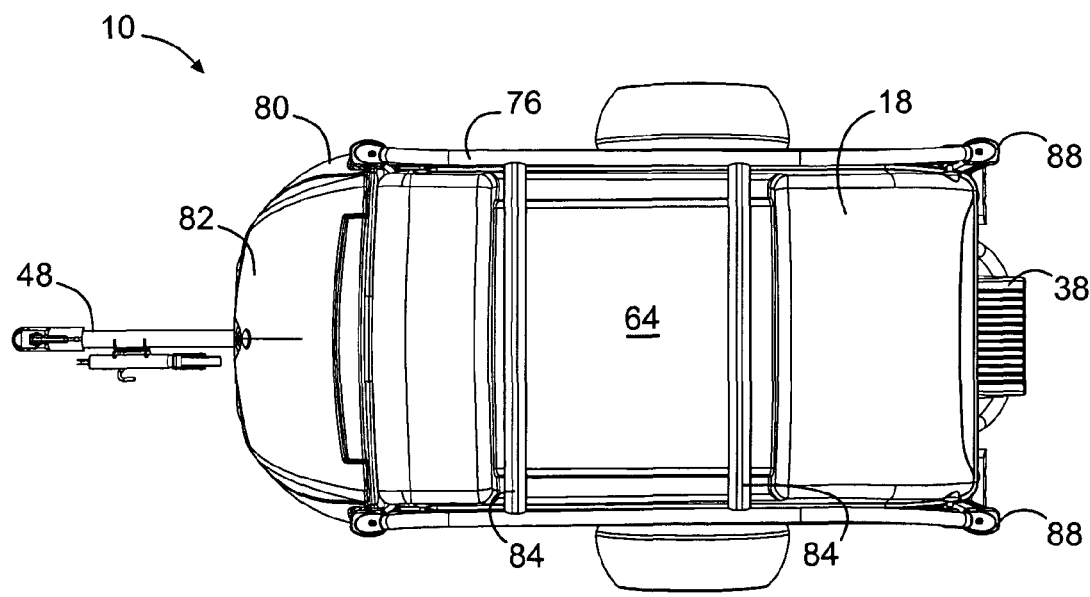
FIG. 4 is a top view of the travel trailer of FIG. 1.
Figure 5:
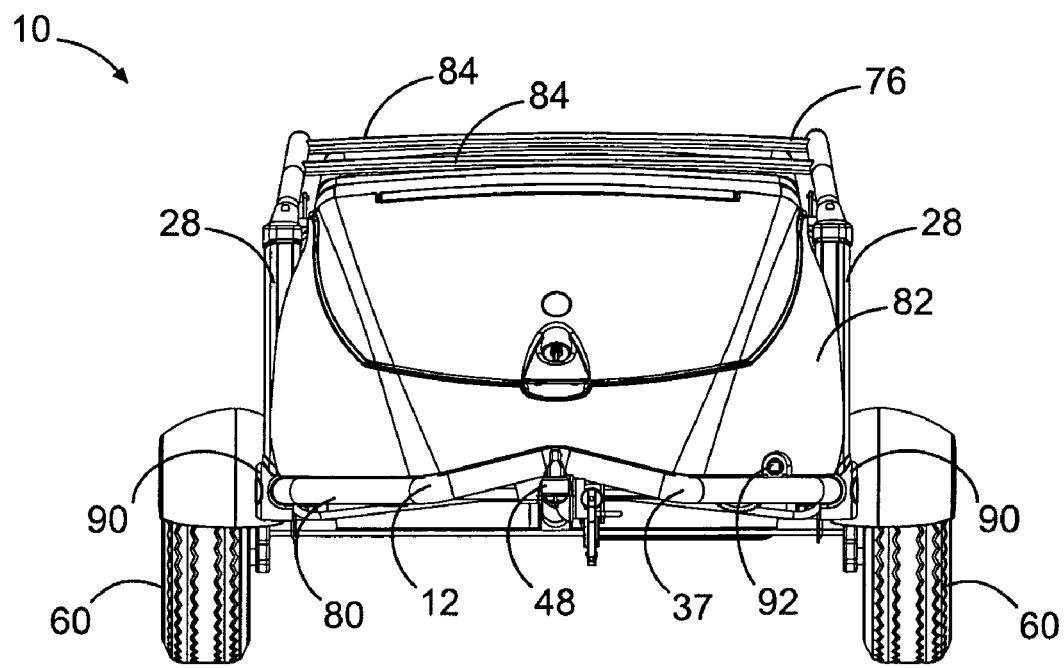
FIG. 5 is a front view of the travel trailer of FIG. 1.
Figure 6:
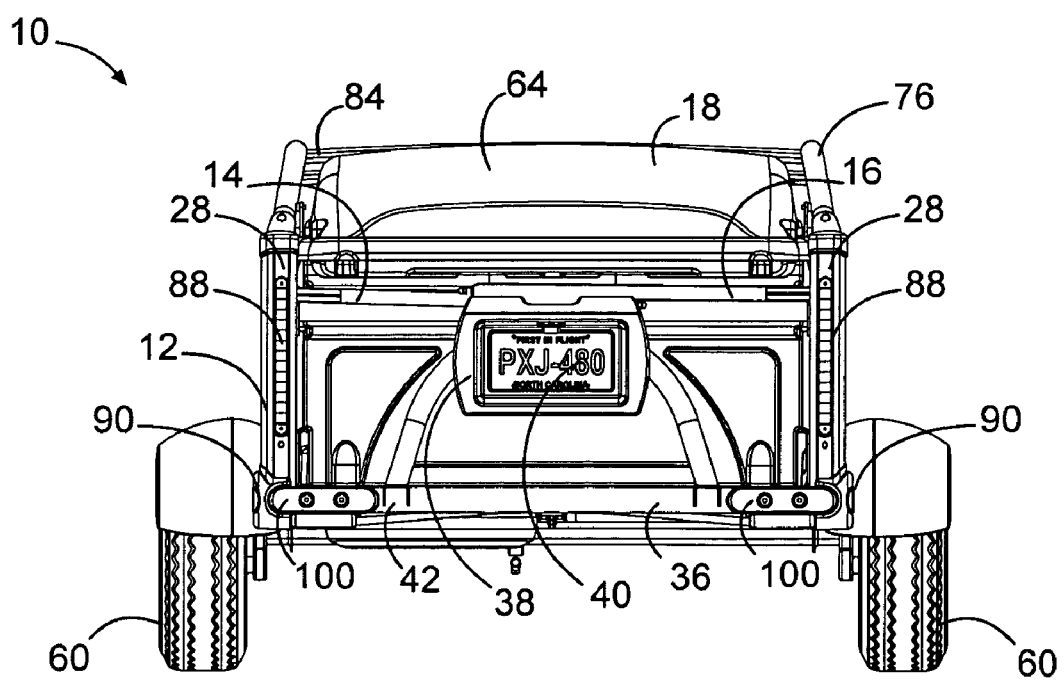
FIG. 6 is a back view of the travel trailer of FIG. 1.

With reference to FIG. 3, the frame 12 has a yoke 34 that is attached to the hitch 48 by way of a hinge connection 50. The hinge connection 50 may be constructed through a journal connection between the yoke 34 and the hitch 48. The yoke 34 may be made of steel in accordance with one exemplary embodiment and may have a generally channel-shaped cross-section. A pin 52 can be present in the hinge connection 50 in order to lock the hinge connection 50 so that the hitch 48 does not rotate with respect to the yoke 34. In this regard, the hitch 48 can have an aperture defined therethrough that is oriented in the inboard/outboard direction of the travel trailer 10. The aperture can be moved into alignment with a channel having a pair of flanges that are arranged on the bottom of a front portion 80 of the frame 12. The pin 52 can be disposed through the apertures of the flanges and the hitch 48 so that the position of the hitch 48 with respect to the frame 12 is fixed. The hitch 48 extends generally in the forward/backward direction of the travel trailer 10 when locked. The yoke 34 has ends that are received within channels formed by the first and second side frame components 30 and 32. The ends of yoke 34 can be bolted, welded or otherwise attached to the first and second side frame components 30 and 32 in order to strengthen and tie the frame 12 together. Further, the yoke 34 may be welded onto the cross-members of the floor 24 in order to further strengthen the overall attachment of this member to the other portions of the travel trailer 10.

Frame 12 also supports a pair of wheels 60 located on either side thereof for mobility. In accordance with one exemplary embodiment, the wheels 60 are ten inches in diameter and are made of aluminum from a casting process. The wheels 60 have a hub that has an open framework structure. Here, a number of spokes radiate out from the center of the hub to its outer perimeter that is engaged with the tire. Use of an aluminum hub with an open structure provides for a reduction in weight of the wheels 60. The tires incorporated into the wheels 60 may be provided by Tredit Tire and Wheel Co., Inc. having offices at 57941 Charlotte Avenue, Elkhart, Ind., USA. The wheels 60 are mounted to the first and second side frame components 30 and 32 through a spindle engagement. However, it is to be understood that a live axle may be employed with respect to the wheels 60 in accordance with other exemplary embodiments. A pair of guards are positioned above the wheels 60 in order to protect the wheels 60 and prevent debris from being thrown therefrom. Additionally, LEDs may be included within the guards of the wheels 60 in order to illuminate the tires of the wheels 60 so that the occupants of the vehicle can observe the tires at night to ensure that they are in proper working condition. The wheels 60 can be attached to the spindles extending from the side frame components 30 and 32 in a variety of manners. For example, a pin may be disposed through both the hub of the wheels 60 and the side frame components 30 and 32 in order to effect this attachment. Other embodiments are possible in which lug nuts or other fasteners are used to effect this connection.

Referring now to FIGS. 1 through 6, a first bed platform 14 is pivotally attached to vertical corner posts 28 of the first side frame component 30. In a similar manner, a second bed platform 16 is pivotally attached to vertical corner posts 28 of the second side frame component 32. The first and second bed platforms 14 and 16 are positioned so as to be folded on top of one another when the travel trailer 10 is placed into the travel configuration. In this regard, the pivot connection between the bed platforms 14, 16 and the side frame components 30 and 32 can be made so that the bed platforms 14, 16 pivot to a certain limit and are then stopped. In particular, a ledge can be incorporated into the interior of the vertical corner posts 28 that is engaged by, and hence limits, a projecting portion of the pin of the pivot connection between the bed platforms 14, 16 and the vertical corner posts. Additionally or alternatively, one or both of the side frame components 30, 32 can have a lip or other portion onto which the bed platforms 14, 16 rest so that they can be properly positioned in the travel configuration.

The bed platforms 14 and 16 have a generally rectangular shaped outer perimeter with a pair of cross-members located therein. The cross-members of the bed platforms 14 and 16 are semi-circular in shape and extend along the forward/backward direction of the travel trailer 10 and extend along approximately half of the width of the bed platforms 14 and 16 meeting one another at approximately the half way point. The bed platforms 14 and 16 are thus arranged so as to have an open construction to decrease wind resistance and to decrease material costs and weight. The bed platforms 14 and 16 may be made out of aluminum in accordance with one exemplary embodiment and may be assembled through a welding process. In the illustrated travel configuration, the bed platforms 14 and 16 extend only part way between the first and second side frame components 30 and 32.

The travel trailer 10 also has a camping pod 18 that is supported by a rack 76 that rests on top of the vertical corner posts 28 in the travel configuration. The camping pod 18 can be molded and is made of plastic in accordance with one exemplary embodiment. The camping pod 18 can have an upper surface that is aerodynamically shaped in order to reduce wind resistance during transport of the travel trailer 10. In this regard, the upper surface of the camping pod 18 is curved in the forward/backward direction of the travel trailer 10. The upper surface of the camping pod 18 has a depression defined thereon located below a pair of cross-members 84 of the rack 76. The depressed portion of the upper surface of the camping pod 18 has a generally flat shape while the adjacent portions in the forward and rearward directions are generally curved in shape. This arrangement assists in decreasing the overall height and weight of the travel trailer 10. However, it is to be understood that other exemplary embodiments are possible in which the upper surface of the camping pod 18 has a continuous shape that is either flat or curved.

As shown with reference to FIGS. 1 to 6, the travel trailer 10 can be placed into a travel configuration so that it has a relatively compact size and a low height. This arrangement assists in reducing wind resistance during transport and also affords the driver a more unobstructed rear view from the towing vehicle. The rack 76 also includes one or more cross-members 84 that stretch essentially between both sides of the travel trailer 10. The various components of the rack 76 such as the cross-members 84 may be made of aluminum. The rack 76 has forward and rearward members that have circular cross-sectional shapes while other components such as the cross-members 84 are elliptical in cross-section. The rack 76 may be variously configured in accordance with other exemplary embodiments. The cross-members 84 can be used to support objects such as kayaks, bicycles or skis. The reduced height of the travel trailer 10 thus allows objects to be placed onto the rack 76 and transported in the travel configuration so that the operator of the towing vehicle can view the transported objects in the rear view mirror. In this regard, the height of the travel trailer 10 may be set such that the top of the travel trailer 10 does not extend beyond the height of the rear window of the towing vehicle so that a driver can see through his or her rear view mirror beyond the travel trailer 10. Observation of the transported objects may be more desirable to the driver as one will have more security knowing that the object is properly positioned as opposed to the situation in which the object is above the line of sight of the driver and thus hidden from view. As such, the travel trailer 10 is capable of transporting objects when in the travel configuration.

The frame 12 also has a rear cross-member 36 located generally at the back end of the travel trailer 10. The rear cross-member 36 spans the first and second side frame components 30 and 32. The rear cross-member 36 may be made of aluminum and may be formed through extrusion and have an outer surface that is at least partially curved. Connecting members 100 can be used to attach the first and second side frame components 30 and 32 to the rear cross-member 36. The connecting members 100 can be integrally formed with the first and second side frame components 30 and 32 or may be welded thereon in certain exemplary embodiments. The first side frame component 30 can have a lower portion that has a cross-section with internal grooves into which a correspondingly grooved portion of the connecting member 100 can be engaged. A plastic bumper portion is incorporated into the connecting member 100 in order to minimize or prevent damage upon contact of the travel trailer 10 with a vehicle or other object. The connecting member 100 includes a generally L-shaped portion that is within the rear cross member 36 and engages the vertical post 28. Two bolts function to attach the bumper portion of the connecting member 100 thereto, and also serve to attach the L-shaped portion of the connecting member 100 to the rear cross member 36. The rear cross member 36 is bolted to the vertical post 28. A second connecting member 100 can be used in a similar manner to help attach the second side frame component 32 and the rear cross-member 36.

A step 38 is mounted onto the rear cross-member 36 by way of a detachable pivot connection 42. The step 38 has a pair of arms that have ends that are pivotally engaged with the rear cross-member 36. The arms of the step have an aperture that is received between a pair of flanges on the rear cross-member 36. A steel pin is disposed therethrough in order to constrain these components to one another in pivoting relation. The first and second side bed panels 14 and 16 can rest onto the step 38 in the travel configuration so that the step 38 is held in place and prevented from moving. The step 38 in turn may function as a stop or rest for the side bed panels 14 and 16 in this regard. Once the side bed panels 14 and 16 are removed from the top of the step 38, the step 38 can be pivoted downward so as to function as a step to aid a user to and from the floor 24 or interior of the travel trailer 10. The pins connecting the arms of the step 38 to the rear cross-member 36 can be removed so that the step 38 can likewise be disengaged from the rear cross-member 36 during loading or unloading of the travel trailer 10. The step 38 has a body section that carries a license plate 40 that is oriented into a display position when the travel trailer is in the travel configuration. The step 38 may be held in the orientation shown in FIGS. 1 through 6 in a variety of alternative manners. For example, the detachable pivot connection 42 may be strong enough to hold the step 38 in the illustrated position, or a pin or other latching member can be used to secure the step 38 to a portion of the frame 12 or rack 76 in order to fix the position of the step 38 as shown. The step 38 may be a cast aluminum part that has a series of grooves disposed thereon in order to aid in traction of the user when being traversed.

The travel trailer 10 can be fitted with a variety of light markers in order to increase its visibility and to comply with various Department of Transportation laws. The vertical corner posts 28 can be formed with a channel that extends in the vertical direction of the travel trailer 10. A series of rear light markers 88 can be installed in the channel of the vertical corner posts 28 in order to illuminate the travel trailer 10 and to alert other drivers that the brakes to the towing vehicle are being applied. The rear light markers 88 may be sealed LED clearance lights as provided by Command Electronics having offices at 15670 Morris Industrial Drive, Schookraft, Mich., USA. The rear light markers 88 can also be used to indicate left and right hand turns of the towing vehicle. A plurality of side light markers 90 can be housed within a plastic mounting piece and positioned on the frame 12 at locations essentially below the vertical corner posts 28. The side light markers 90 may be amber and red side lamps as provided by Truck-Lite® Co., Inc., having offices at 310 East Elmwood Avenue, Fakoner, N.Y., USA.

Figure 7:
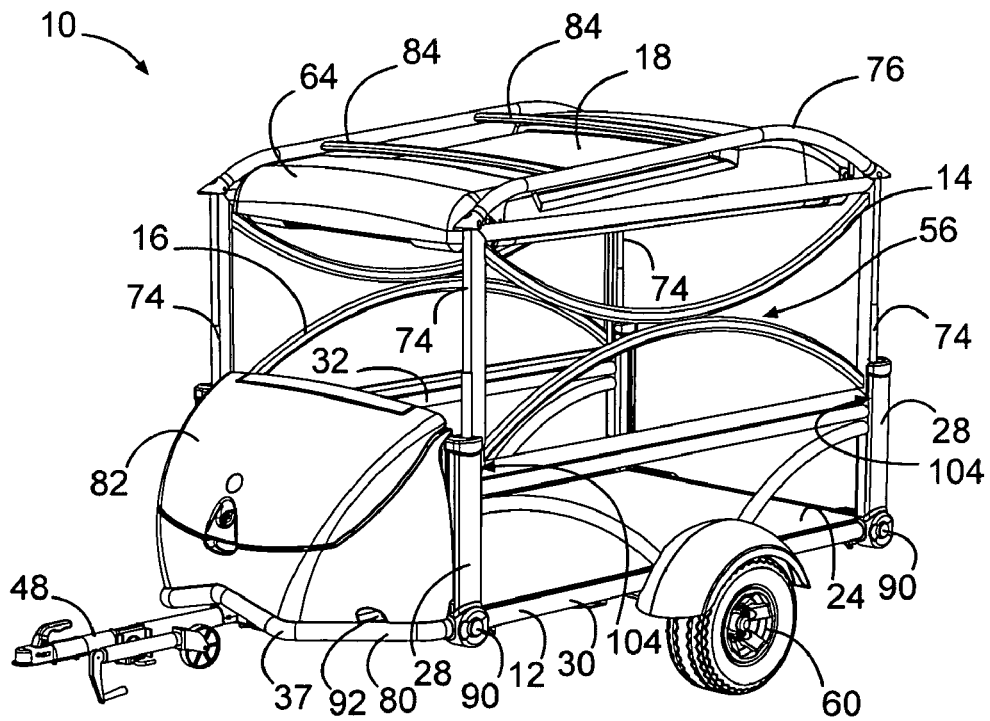
FIG. 7 is a perspective view of a travel trailer in a transport configuration in accordance with one exemplary embodiment.
Figure 8:
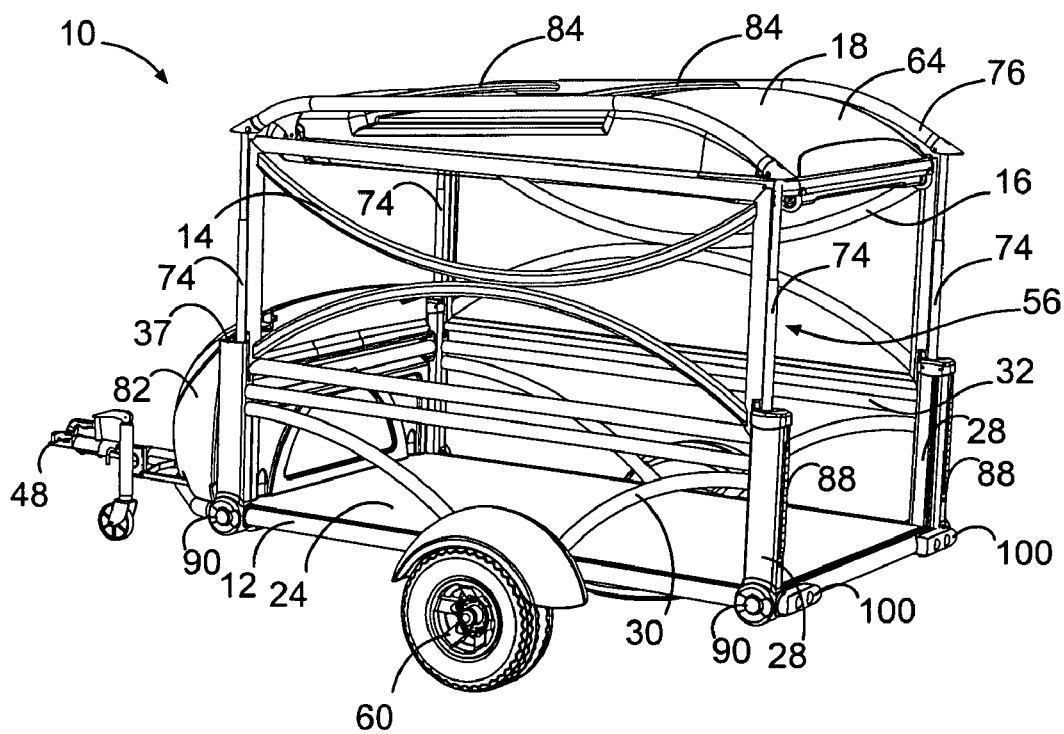
FIG. 8 is a back perspective view of the travel trailer of FIG. 7.

FIGS. 7 and 8 show the travel trailer 10 reconfigured from the travel configuration into a transport configuration. In the transport configuration, a transport area 56 is defined in the travel trailer 10 into which any variety of objects 58 can be placed for transport. The frame 12 supports a floor 24 onto which the objects 58 can be placed. The floor 24 can be a grate or can be a solid piece in accordance with various exemplary embodiments. When provided as a solid piece, the surface of the floor 24 can have traction enabled features, such as projections extending therefrom, in order to enhance footing. The solid floor 24 surface can be a single piece or may be multiple pieces that are assembled and welded into place. In accordance with one exemplary embodiment, the floor 24 has a solid piece surface that is made from multiple pieces and has traction features stamped therein. The camping pod 18 is located above the transport area 56 when the travel trailer 10 is placed into the transport configuration. The camping pod 18 contains tent fabric 20 that is of a generally light weight so that the travel trailer 10 will still maintain a low center of gravity and will resist becoming unstable and tipping over when placed into the transport configuration with proper loading of the transport area 56. Additionally, the positioning of the camping pod 18 above the axle of wheels 60 may provide for greater stability of the travel trailer 10 than in situations in which the camping pod 18 is located in the front of the travel trailer 10 or in the rear of the travel trailer 10.

In order to convert the travel trailer 10 from the travel configuration into the transport configuration, the camping pod 18 is elevated in the vertical direction away from the floor 24. Although a variety of means may be employed in order to lift the camping pod 18, a lifting mechanism 26 is used in the exemplary embodiment shown. Referring back to FIG. 5, the lifting mechanism 26 includes a socket 92. A tool (not shown) can be stored in the front storage box 82 and can be removed therefrom when actuation of the lifting mechanism 26 is desired. The tool can be loosely stored in the front storage box 82 or may be placed into a molded retaining recess formed in the front storage box 82. The user can insert the tool into the socket 92 and rotate the tool therein in order to generate rotational movement in the lifting mechanism 26. FIG. 3 shows a transmission 86 of the lifting mechanism 26 that is used to transfer rotational motion of the socket 92. The transmission 86 is welded onto the floor 24 of the frame 12. However, other methods of attachment, such as bolting or the use of mechanical fasteners, may be employed in accordance with other exemplary embodiments. The lifting mechanism 26 may include a handle and cable as supplied by Dutton-Lainson Co. having offices at 451 West Second Street, Hastings Nebr., USA. The lift tubes and guide tubes of the transmission 86 and lifting mechanism 26 may be a crank system as provided by Goshen Stamping Co. Inc. having offices located at 1025 South tenth Street, Goshen, Ind., USA.

Figure 9:
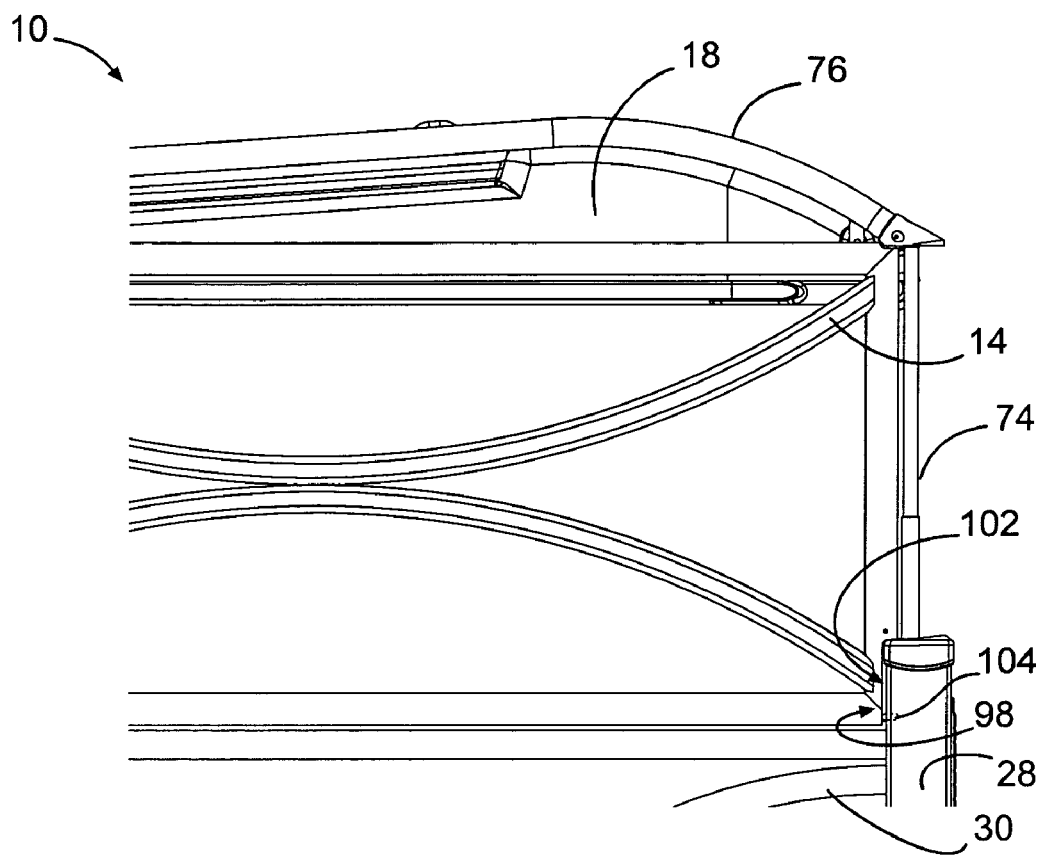
FIG. 9 is a detailed side view of the travel trailer of FIG. 7 showing the interaction between a bed platform and a telescoping member.

Referring now to FIGS. 7 and 8, the telescoping members 74 extend through transmission of motion from the transmission 86 of the lifting mechanism 26. In this manner, rotational motion imparted by the user turning a tool (not shown) in the socket 92 is translated by the lifting mechanism 26 into linear motion of the telescoping members 74. The telescoping members 74 extend from the vertical corner posts 28 in a generally linear direction away from the floor 24. The top of the telescoping members 74 engage the rack 76 and thus cause the rack 76 and the attached camping pod 18 to raise when the telescoping members 74 are extended. Next, the user may unfold the first bed platform 14 so that it achieves an essentially vertical orientation. The vertical corner posts 28 that support the first bed platform 14 have slots 98, visible in FIG. 2, through which pins 104 extend from the first bed platform 14 into the vertical corner posts 28. The pins 104 are shown in the detailed, side view of the travel trailer 10 in FIG. 9. The arrangement is such that the first bed platform 14 can be moved linearly upwards along the slots 98 and then rotated into the vertical orientation shown. The pin 104 thus slidingly and pivotally engages the vertical corner posts 28. A cut-out portion 102 is defined by the first bed platform 14 to provide clearance about the upper portions of the vertical posts 28 to allow the first bed platform 14 to rotate around the vertical corner posts 28. Once the first bed platform 14 is oriented into a vertical position, it is lowered downward along slots 98 so that a portion of the first bed platform 14 rests on top of the vertical corner posts 28 as shown in FIG. 9. In this regard, a recessed area or a pin and hole arrangement can be used in order to secure the first bed platform 14 onto the vertical corner posts 28 in the vertical orientation. In a particular exemplary embodiment, the first bed platform 14 has a hole that receives a pin that extends from the top of the vertical corner post 28. A set pin is also inserted into this connection in order to provide for a more secure attachment and to eliminate or reduce vibration. The pins and set pins may be made of steel in the disclosed exemplary embodiment.

The lifting mechanism 26 can then be actuated so that the telescoping members 74 are lowered thus causing the rack 76 to be moved down onto the top of the first bed platform 14 as shown in FIG. 9. Again, a recess or a pin and hole combination can be used in order to more properly secure the engagement between the first bed platform 14 and the rack 76. In accordance with one exemplary embodiment, the first bed platform 14 has a pin extending therefrom that is received within a mating hole defined on the bottom of the rack 76. A set pin is again disposed into this connection. As such, in accordance with one exemplary embodiment, eight set pins may need to be removed in order to raise and lower the pod 18 between the travel and the raised configuration.

The first bed platform 14 can thus be reconfigured into a vertical orientation when placed in the transport configuration and be appropriately secured during transport. In a similar manner, the second bed platform 16 can be oriented from the folded position in the travel configuration into the vertical position in the transport configuration. The arrangement and features of the second bed platform 16 can be similar to those previously discussed with respect to the first bed platform 14 and a repeat of these characteristics is not necessary.

Once the bed platforms 14 and 16 have been oriented into the transport configuration an enlarged transport area 56 is formed in the travel trailer 10. The transport area 56 can be large enough to hold an all terrain vehicle (ATV) 58 so that one may transport the ATV 58 to a desired location. Additionally, the travel trailer 10 may be made light enough so that once arriving at a staging location one may hook the travel trailer 10 up to the ATV 58 so that the travel trailer 10 can be transported to a desired area inaccessible to the towing vehicle. The detachable pivot connection 42 can be released so that the step 38 is removed from the rear cross-member 36. Removal of step 38 allows the transport area 56 to be more easily accessed. The first bed platform 14, second bed platform 16 and vertical corner posts 28 form a generally open framework so that wind resistance is minimized when transporting the travel trailer 10 in the transport configuration.

Figure 10A:
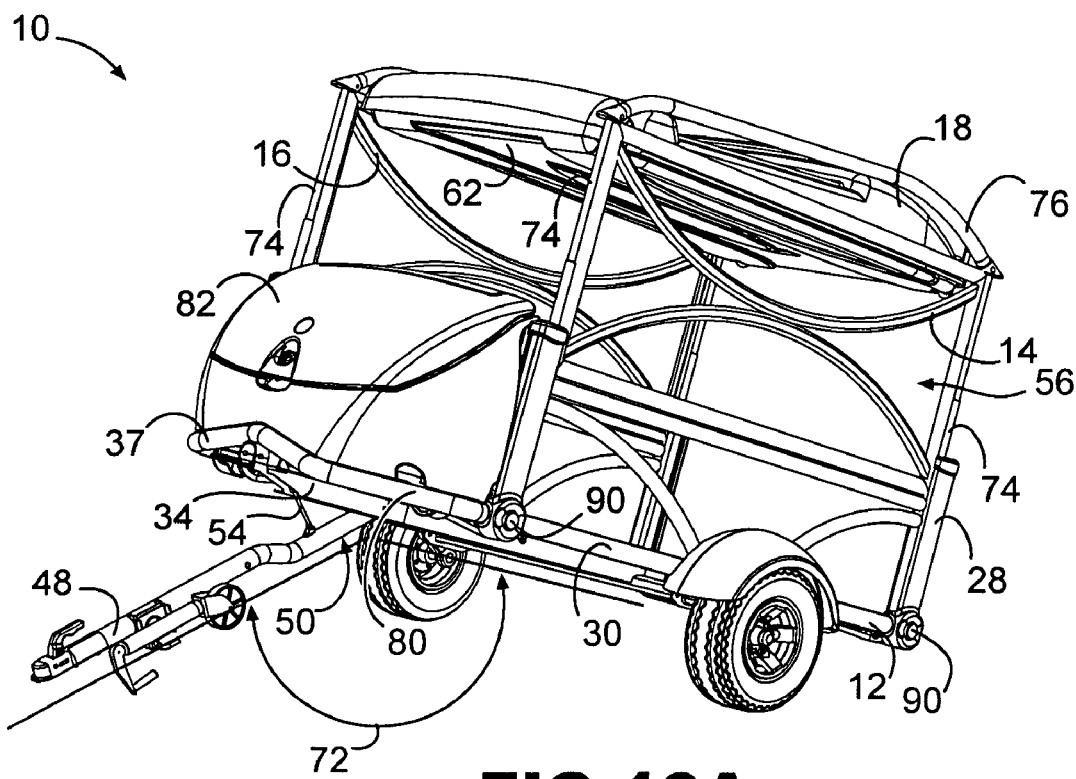
FIG. 10A is a perspective view of a travel trailer in the transport configuration that is tilted in order to assist in the loading of a vehicle in accordance with one exemplary embodiment.
Figure 10B:
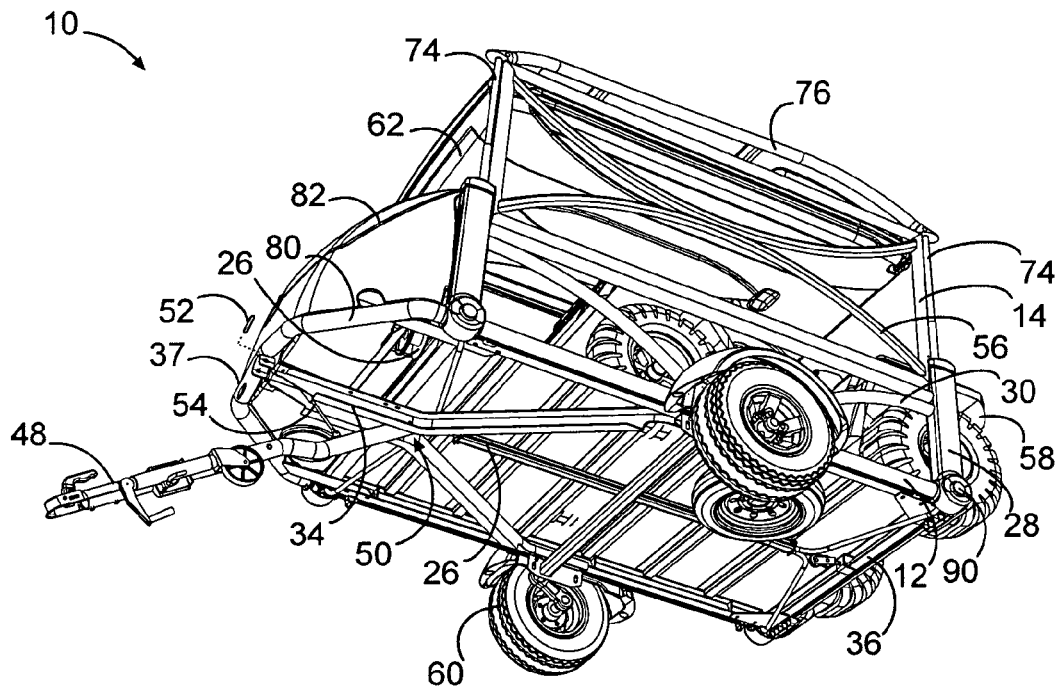
FIG. 10B is a bottom perspective view of the travel trailer of FIG. 10A.

The travel trailer 10 can be arranged with certain features to allow the ATV 58 to be more easily loaded and unloaded therefrom. The travel trailer 10 can be provided with a hinge connection 50 in accordance with one exemplary embodiment. The hinge connection 50 is located between the wheels 60 of the travel trailer 10 and the connection point to the towing vehicle. The hinge connection 50 is shown in a non-actuated position in FIGS. 1 and 3 in which the travel trailer 10 is in the travel configuration. The pin 52 functions to keep the yoke 34 and the hitch 48 locked into position with one another. As shown in FIG. 10A and FIG. 10B, the hinge connection 50 can be used to modify an angle 72 between the floor 24 and the hitch 48. In this regard, the pin 52 of the hinge connection 50 can be removed in order to allow the hitch 48 to rotate with respect to the yoke 34. Any type of hinge connection 50 can be used to allow the hitch 48 and yoke 34 to pivot. The hinge connection 50 may be made through the use of bushings or springs or may be made without an extra component such that the yoke 34 and hitch 48 are connected in such a manner that they can integrally pivot with respect to one another. In accordance with one exemplary embodiment, the rearward end of the hitch 48 has a pin that is disposed in the inboard/outboard direction of the travel trailer 10. The yoke 34 includes a pair of bushings that receive the pin of the hitch 48 to thus result in the hinge connection 50. A damper 54 can be connected to the hitch 48 and to the frame 12 so that upon the removal of pin 52 the hitch 48 and yoke 34 do not uncontrollably pivot. The damper 54 thus allows for a slower rate of pivoting to be realized between the hitch 48 and yoke 34 so that damage to the travel trailer 10 or items proximate thereto does not occur. Flanges may be present on the hitch 48 and frame 12 to which the damper 54 is pivotally attached. The damper 54 can be bolted to the flanges on the hitch 48 and frame 12 in order to result in a pivoted arrangement. The damper 54 may be a P7260 model number damper supplied by AVM Industries having offices located at Highway 76 East, Marion, S.C., USA.

Figure 11:
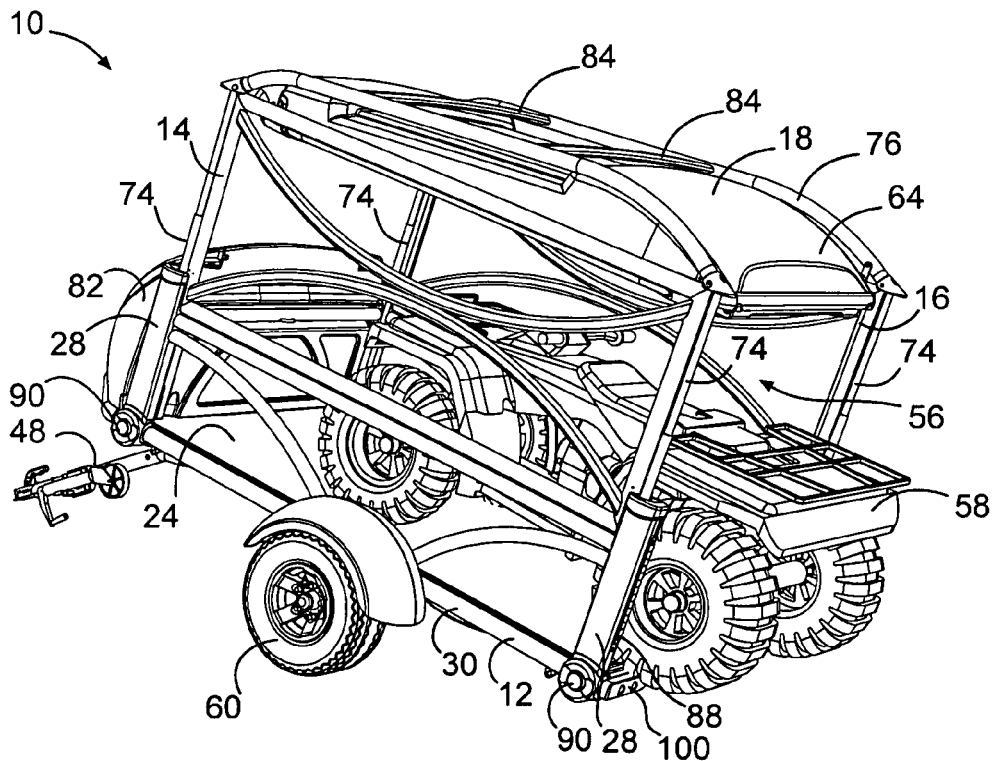
FIG. 11 is a back perspective view of the travel trailer of FIG. 10A in which an all terrain vehicle is being loaded thereon.
Figure 12:
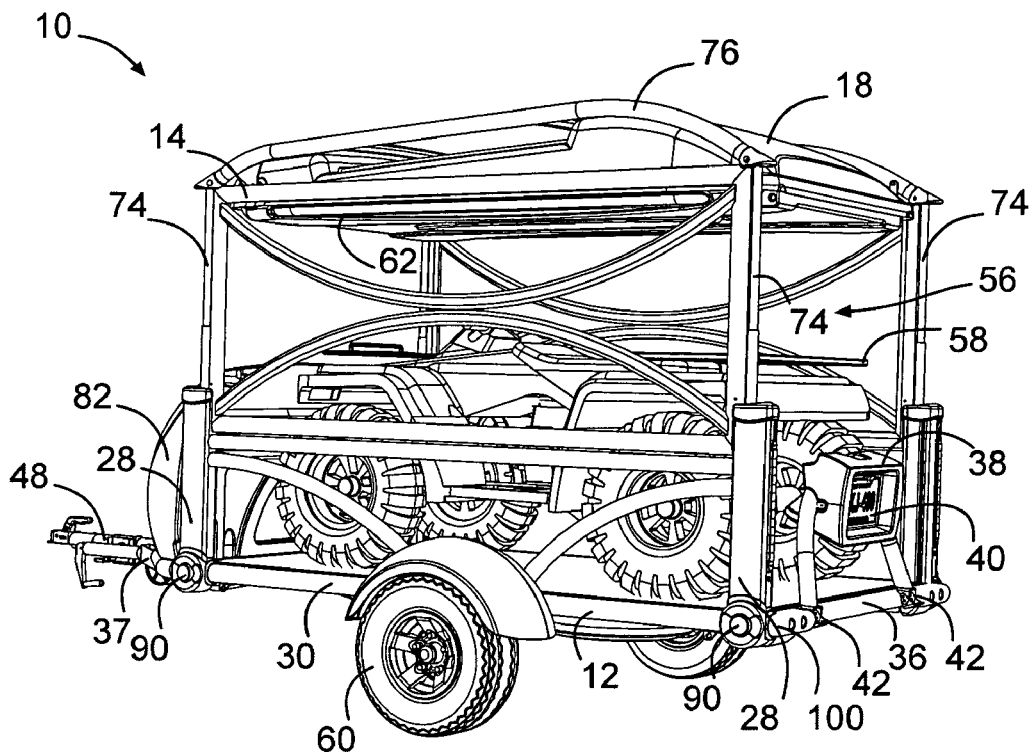
FIG. 12 is a back perspective view of the travel trailer of FIG. 10A in which the travel trailer is not tilted and an all terrain vehicle is loaded thereon for transport.

The hinge connection 50 can be actuated so that the angle 72 is reduced from the non-actuated position. In accordance with various exemplary embodiments, angle 72 may be from 120° to 175° when hinge connection 50 is actuated. The travel trailer 10 can be positioned as shown in FIG. 11 so that the rear cross-member 36 is touching or is in close proximity to the ground. Consequently, the floor 24 is positioned within close proximity to the ground so that the object 58 (ATV) can be easily driven thereon. In this configuration, the step 38 is removed from the rear cross-member 36 as previously discussed in order to provide unobstructed access to and from the floor 24. Without the pivoting feature of the travel trailer 10, it may be necessary to lift the ATV 58 onto the floor 24 or position ramps or other lifting devices proximate to floor 24 in order to load the travel trailer 10. ATV 58 can be moved along floor 24 until a sufficient amount of weight is located forward of the wheels 60. At this time, the floor 24 will begin to pivot with respect to the hitch 48 so that the angle 72 increases. The hinge connection 50 will thus return to its original, non-actuated position as shown in FIG. 12 with the ATV 58 fully loaded into the transport area 56. The damper 54 will likewise act to slow and control the pivoting of hinge connection 50 when the weight of ATV 58 causes the hinge connection 50 to return to the non-actuated orientation.

The hinge connection 50 can be actuated when the travel trailer 10 is attached to the towing vehicle. As such, the floor 24 can be pivoted with respect to the hitch 48 so that its end is proximate to or touching the ground in order to aid in the loading of objects 58 such as the ATV 58. As such, the travel trailer 10 need not be removed from the towing vehicle in order to pivot the floor 24 with respect to the hitch 48 to position the floor 24 so as to aid in loading ATVs 58 thereon. The hitch 48 may remain in an orientation essentially parallel to the ground while the floor 24 is pivoted into the desired position. Once loaded, the pin 52 can be reinserted into the hinge connection 50 in order to lock the hinge connection 50 and prepare the travel trailer 10 for transport. In order to unload the ATV 58 from the transport area 56, the pin 52 can once again be removed in order to pivot the floor 24 with respect to the hitch 48 so that the floor 24 is located proximate to the ground to assist in removal of the ATV 58. The floor 24 can be pivoted to allow the ATV 58 to be unloaded while the hitch 48 remains attached to the towing vehicle. As such, the hinge connection 50 is arranged so that the hitch 48 does not need to be removed from the towing vehicle during loading and unloading of the ATV 58. Although not shown, once the ATV 58 is loaded onto the travel trailer 10 the detachable pivot connection 42 can be reattached to the rear cross-member 36 as previously discussed to attach the step 38 so that the license plate 40 is displayed to other drivers. Also, the step 38 can be further secured to the frame 12, bed platforms 14 and 16, or to the telescoping members 74 to act as a gate to prevent the ATV 58 from falling out of the travel trailer 10 during transport. However, other means, such as tie downs, of preventing the ATV 58 from falling out of travel trailer 10 may be employed so long as appropriate procedures are followed by the operator.

Figure 13:
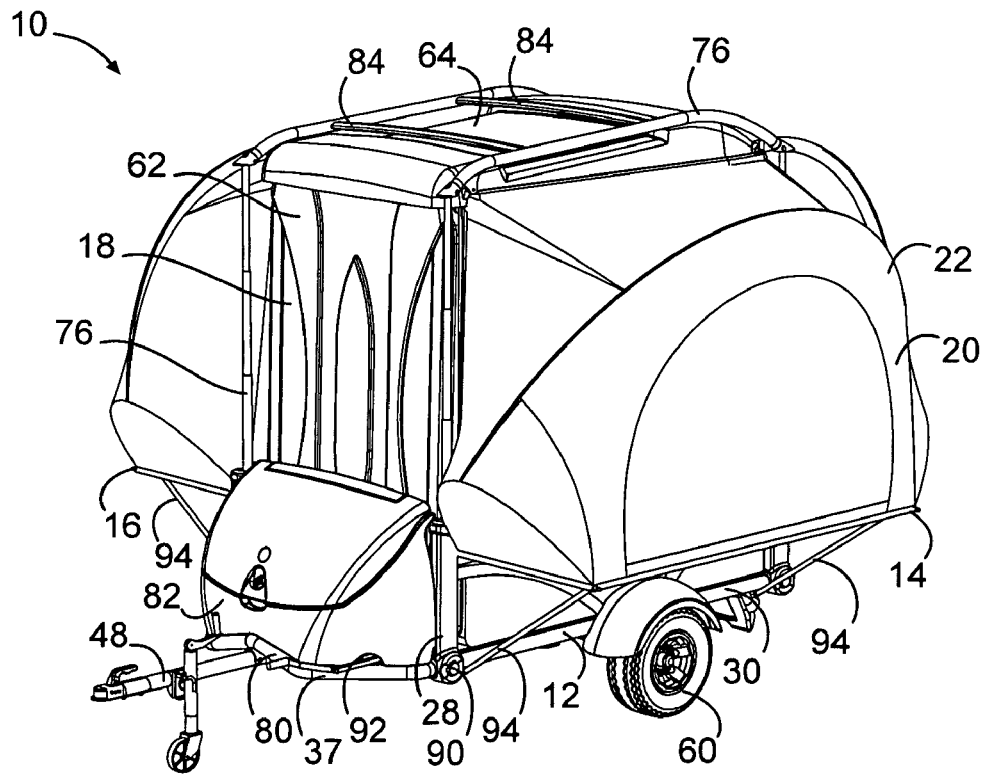
FIG. 13 is a perspective view of a travel trailer in a camping configuration in accordance with one exemplary embodiment.
Figure 14:
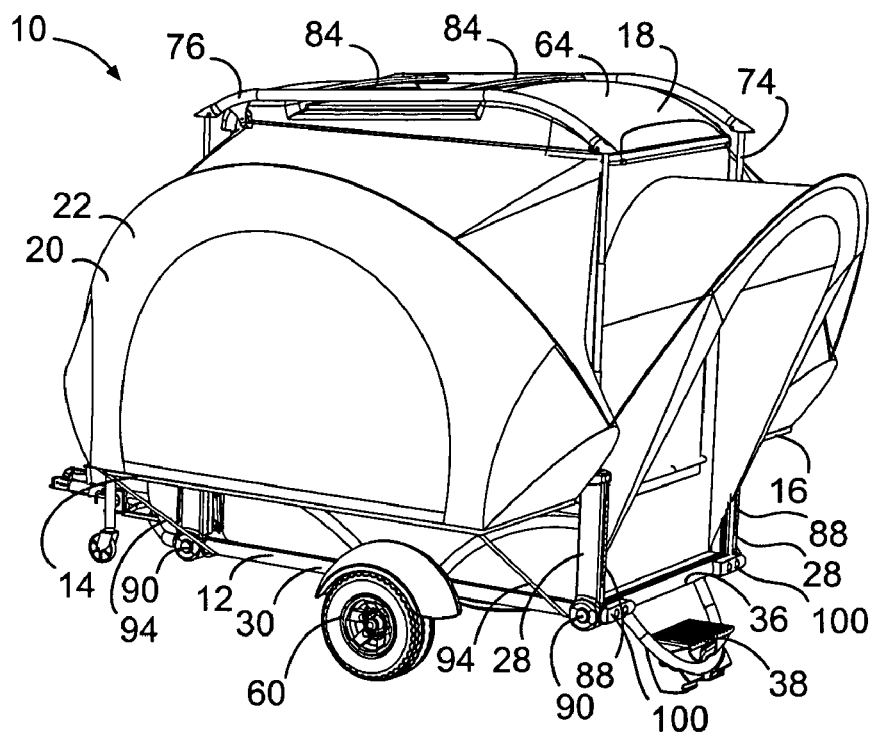
FIG. 14 is a back perspective view of the travel trailer of FIG. 13.

The travel trailer 10 can also be configured into a camping configuration in which tent fabric 20 is deployed on the travel trailer 10 in order to form a tent 22 to provide shelter. The travel trailer 10 is oriented into the camping configuration in FIGS. 13 and 14. In order to place the travel trailer 10 into the camping configuration from the transport configuration, the lifting mechanism 26 is actuated in order to raise the camping pod 18 so that it no longer engages the first and second bed platforms 14 and 16. The step 38 may be rotated out of its vertical position and placed onto the ground so as to function as a step into and out of the interior of the travel trailer 10. If the travel trailer 10 was in the ATV mode, the ATV 58 or other objects in the transport area 56 are removed, the step 38 is reattached, and lifting of the camping pod 18 is not necessary. Assuming that the travel trailer 10 was in the travel configuration, once the camping pod 18 is lifted the first and second bed platforms 14 and 16 can be folded outwards so that they are located generally outside of the footprint of frame 12. As previously stated, the bed platforms 14 and 16 are pivotally mounted to the vertical corner posts 28 to allow for this rotation. The bed platforms 14 and 16 can be unfolded to a location essentially one hundred and eighty degrees from their folded position when in the travel configuration. A ledge may be present on the vertical corner posts 28 or on the top of the side frames 30 and 32 to limit rotational movement of the bed platforms 14 and 16. A plurality of bed platform supports 94 may then be manually grasped and positioned by the user. The bed platform supports 94 may be stored in the front storage box 82 in accordance with certain exemplary embodiments. Bed platform supports 94 can engage the bed platforms 14 and 16 and the frame 12 in order to hold the bed platforms 14 and 16 in a desired position. In this regard, the bed platform supports 94 are elongated members made of steel that have flanges on either end that simply hook onto and rest against frame 12 and the bed platforms 14 and 16. Other arrangements are possible. For example, receiving apertures may be present in the frame 12 and bed platforms 14 and 16. The bed platform supports 94 can be inserted into and received within the receiving apertures of the frame 12 and bed platforms 14 and 16 in order to provide support thereto. In yet other exemplary embodiments, flanges with apertures may extend from the frame 12 and receive cylindrical ends of the bed platform supports 94. The opposite cylindrical ends of the bed platform supports 94 can be received within apertures of the bed platforms 14 and 16. The bed platform supports 94 can fully support the bed platforms 14 and 16 in the positions shown or may be present in order to help support bed platforms 14 and 16. In this regard, the bed platforms 14 and 16 may be locked into the camping configuration position through interaction with the pins 104 that may limit their rotational orientation. Further, as stated ledges may also be present on the vertical corner posts 28 or side frame components 30 and 32 in order to assist in holding the bed platforms 14 and 16.

Figure 15:
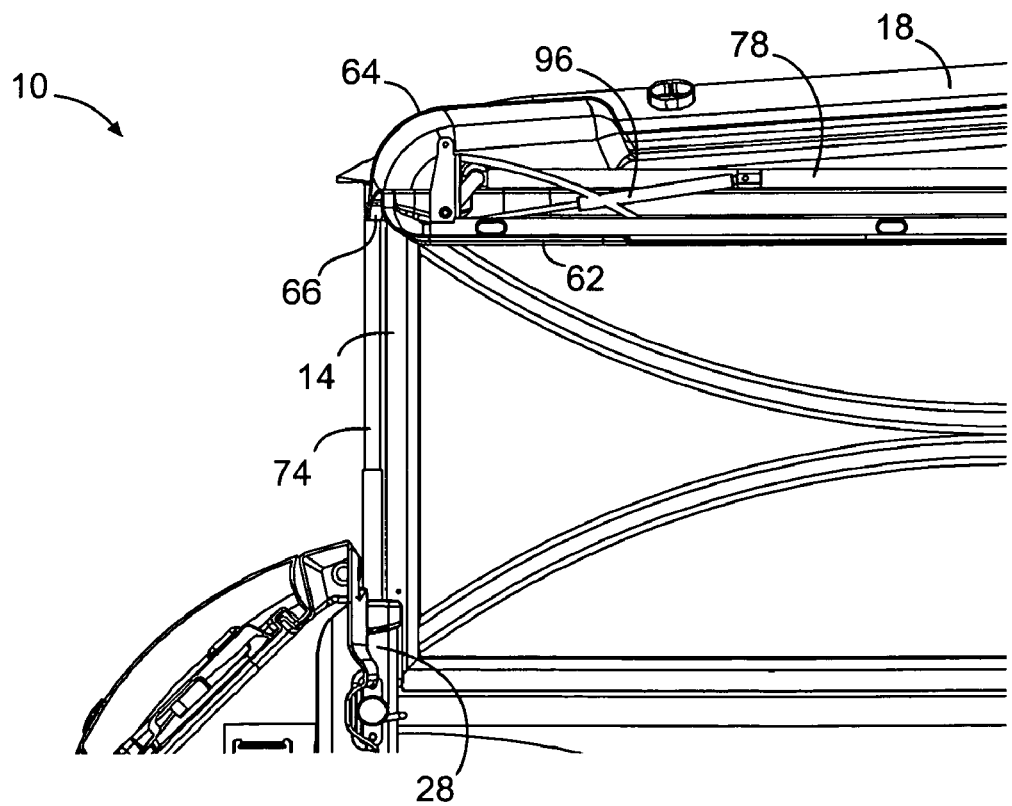
FIG. 15 is a detailed, side cross-sectional view of a travel trailer in the transport configuration in which the arrangement of the camping pod is illustrated in accordance with one exemplary embodiment.
Figure 16:
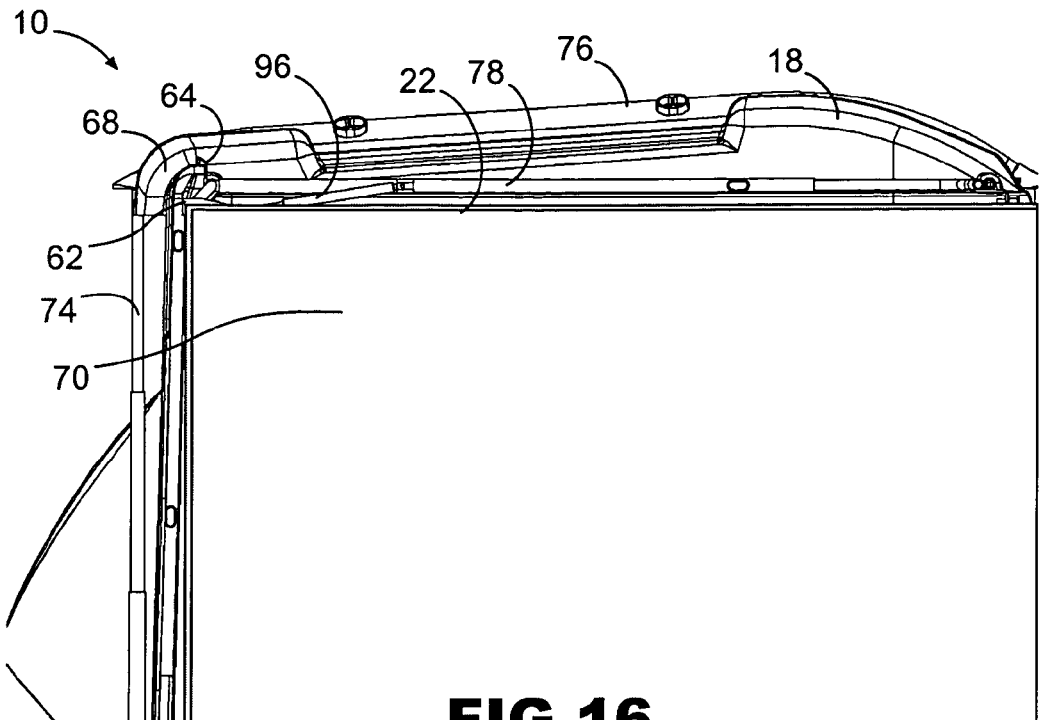
FIG. 16 is a detailed, side cross-sectional view of the travel trailer of FIG. 15 converted into the camping configuration in which the arrangement of the opened camping pod is illustrated.

After positioning the first and second bed platforms 14 and 16 into the camping configuration the step 38 may be rotated about the rear cross-member 36 in order to assist a user in entering and exiting the rear of the travel trailer 10 if not already positioned. Also, the camping pod 18 can be opened in order to deploy the tent fabric 20 and form tent 22. A latch is present at the rearward portion of the camping pod 18 that can be actuated by the user in order to effect opening. The latch on the camping pod 18 can be made of a rotary latch—LH—pullback, a rotary latch—RH—pullback, and a striker bolt assembly "N" supplied by Southco® Marine having offices located at 501 Haverty Court Suite J, Rockledge, Fla., USA. The camping pod 18 can be a clamshell type component that has a bottom portion 62 and a top portion 64. FIG. 15 is a cross-sectional, detailed view of the travel trailer 10 in the transport configuration. The camping pod 18 has a bottom portion 62 that is hinged to the top portion 64 at approximately the front of the camping pod 18. The bottom portion 62 is arranged so that its engagement with the top portion 64 forms a seal 66 as shown for keeping water out of the camping pod 18 while driving down the road. The user may unlatch the camping pod 18 so that the bottom portion 62 swings downward while the top portion 64 remains held to and supported by the rack 76. This arrangement is shown in FIG. 16. Pivoting of the bottom portion 62 about the top portion 64 causes the seal 66 to be opened thus resulting in the formation of a vent 68 as shown. The vent 68 functions to increase air flow into and out of the interior 70 of tent 22 when the travel trailer 10 is placed into the camping configuration. In accordance with one exemplary embodiment, air flow may enter the tent 22 though windows defined in the tent fabric 20 and can exit the tent 22 through the vent 68. A section of tent fabric 20 can be present under the camping pod 18 so that mosquitoes and other bugs cannot find their way through vent 68 and into the interior 70 when camping. A portion of the tent fabric 20 can be both solid polyester and mosquito-proof mesh that extends across the entire roof of the tent 22 in order to afford cooling to the interior of the tent 22 and prevent the entry of insects.

Figure 17:
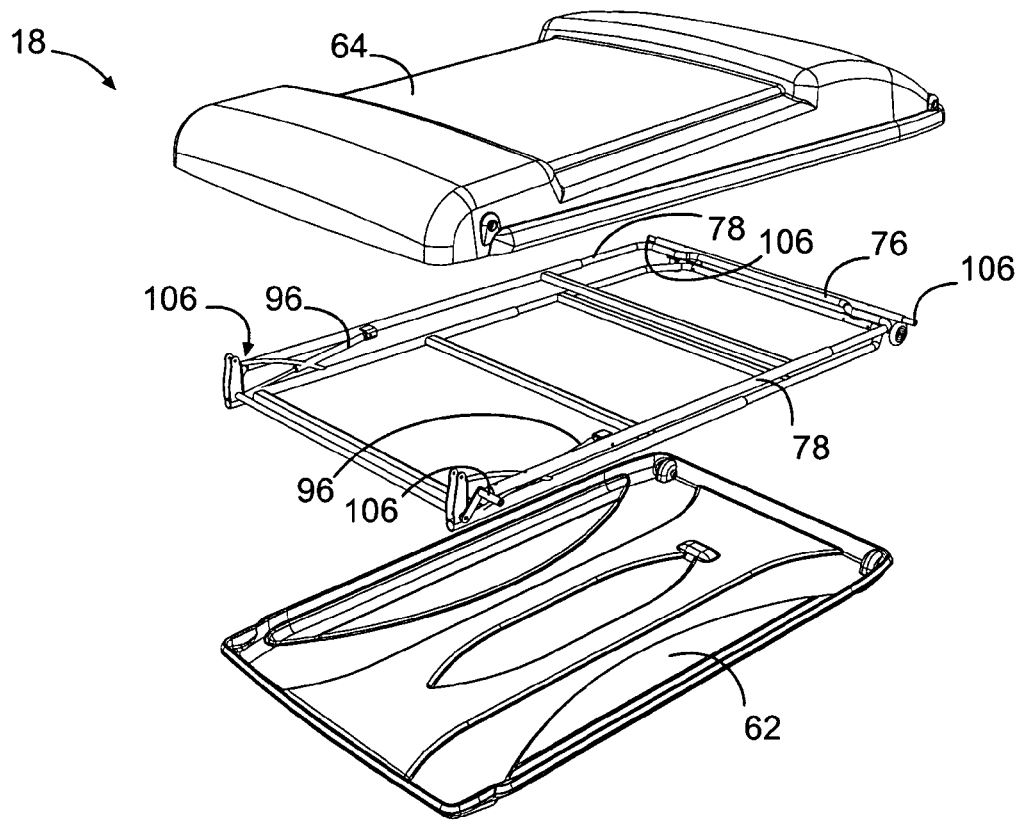
FIG. 17 is an exploded assembly view of a rack and camping pod in accordance with one exemplary embodiment.

The camping pod 18 may include a damper 96 that functions to control the lowering of the bottom portion 62 when opening the camping pod 18. The damper 96 thus prevents the bottom portion 62 from potentially falling suddenly and injuring the user, breaking, or causing damage to items in the travel trailer 10. The damper 96 can be pivotally connected to both the bottom portion 62 and top portion 64 of the camping pod 18. Damper 96 may be a P7260 model number damper provided by AVM Industries having offices at Highway 76 East, Marion, S.C., USA. One or more springs may also be included and can be attached to both the bottom portion 62 and the top portion 64 of the camping pod 18 in order to provide a controlled descent of the bottom portion 62 when lowering. The springs may also be obtained by AVM Industries. FIG. 17 shows an exploded assembly view of the camping pod 18 and the rack 76. The camping pod 18 also includes a telescoping component 78 to account for variations in thermal expansion and contraction of connected components. For example, if made of a plastic material the camping pod 18 may expand and contract at a different rate than the rack 76, which may be made of aluminum, in response to temperature variations. Engagement between the rack 76 and camping pod 18 can be effected through the telescoping component 78 that allows them to slide or move with respect to one another. The telescoping component 78 includes members that are fitted within one another and are capable of sliding with respect to one another to accommodate movement. As such, lengthwise expansion or contraction of the camping pod 18 at a different rate than the rack 76 can be accommodated through movement of the telescoping component 78 so that neither of these parts becomes distressed upon expansion or contraction at different rates through thermal forces. The telescoping portions 78 are associated with both the bottom portion 62 and top portion 64 of the camping pod 18 in that a pair of telescoping portions 78 are pinned to the top portion 64 and a pair of telescoping portions 78 are engaged with the bottom portion 62 as shown. The camping pod 18 is mounted onto the rack 76 by way of four pins 106. Space can be provided along the pins 106 so that upon expansion and contraction of the rack 76 and camping pod 18 at different rates the relative position of the camping pod 18 along the pins 106 can be varied. The space provided by pins 106 therefore accommodates widthwise variations between different rates of thermal expansion and contraction of the camping pod 18 and the rack 76. Cross members are also present in the camping pod 18 to support the telescoping portions 78 and other components of the camping pod 18.

Figure 18:
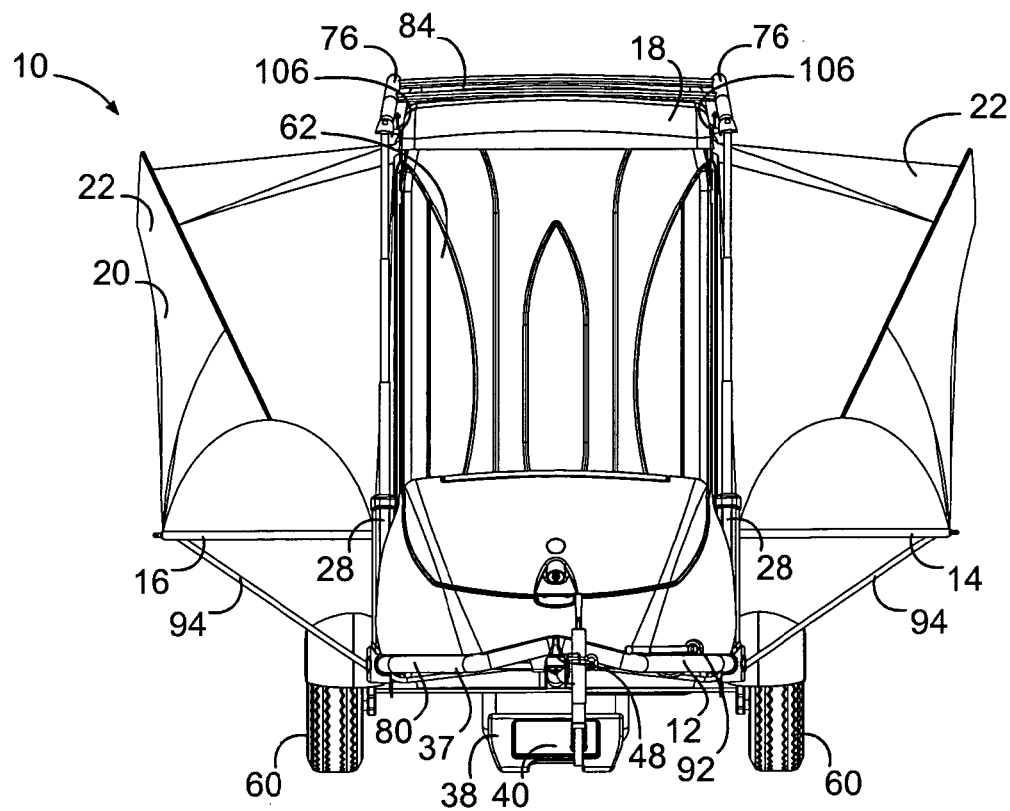
FIG. 18 is a front view of the travel trailer of FIG. 13.

The camping pod 18 is opened when forming the tent 22. The bottom portion 62 of the camping pod 18 becomes the front wall of the tent 22, as shown in FIG. 18, when the camping pod 18 is opened. The bottom portion 62 can be held in place through mechanical fasteners or through some other mechanism to the floor 24 or frame 12 in various exemplary embodiments. Other embodiments exist in which the bottom portion 62 simply pivots downward and remains in the vertical position until pulled back up by the user. As previously discussed, one or more springs may be attached to both the bottom portion 62 and the top portion 64 to assist in controlling the lowering of the bottom portion 62. The springs can be arranged in such a manner that they function to resist lowering of the bottom portion 62 to a certain point at which they then function to hold the bottom portion 62 in the downward position. Such arrangements are possible upon positioning the attachment points of the springs with respect to the bottom portion 62 and the top portion 64. In accordance with one exemplary embodiment, the springs function to pull the bottom portion 62 back into the closed position until the user rotates the bottom portion 62 past vertical. At this point, the springs then function to prevent the bottom portion 62 from rotating back into the closed position. As such, the springs may be provided to function to lock the bottom portion 62 in the open position thus requiring force from the user be applied to reorient same back into the closed position with the top portion 64.

Figure 19:
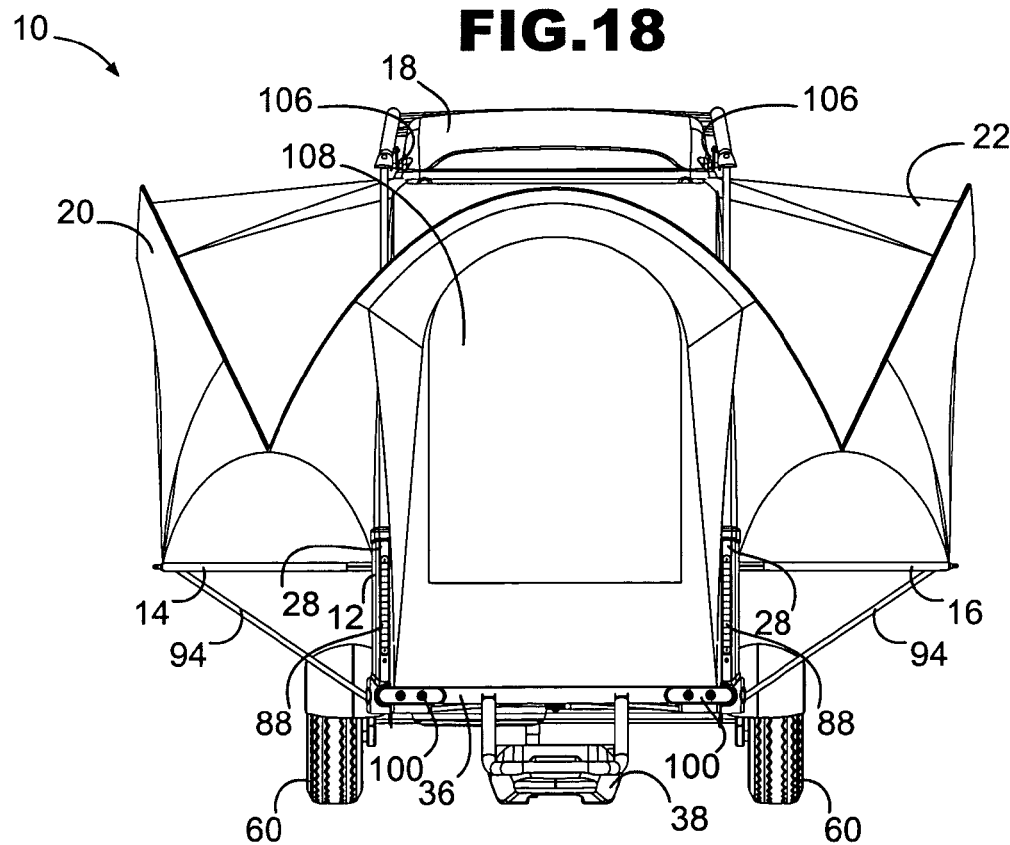
FIG. 19 is a back view of the travel trailer of FIG. 13.

As shown in FIG. 19, the tent 22 is arranged so that a door 108 is located on the rear of the travel trailer 10 to allow a user to gain access to the interior 70 of the tent 22. The door 108 may be opened by unzipping a zipper in the tent fabric 20. In this regard, the door 108 is made of a zipper in the tent fabric 20 that can be opened and closed in order to likewise open and close the door 108. Additionally or alternatively, latches or hook and loop type fasteners can be used to open and close the door 108. Access to and from the interior 70 is thus gained through the rear of the travel trailer 10. However, other embodiments are also possible in which access to the interior 70 can be gained through the front or through one or more of the sides of the tent 22. The step 38 is positioned in the camping configuration so that it is located generally beneath the door 108 to assist a user in entering and exiting the interior 70.

Figure 20:
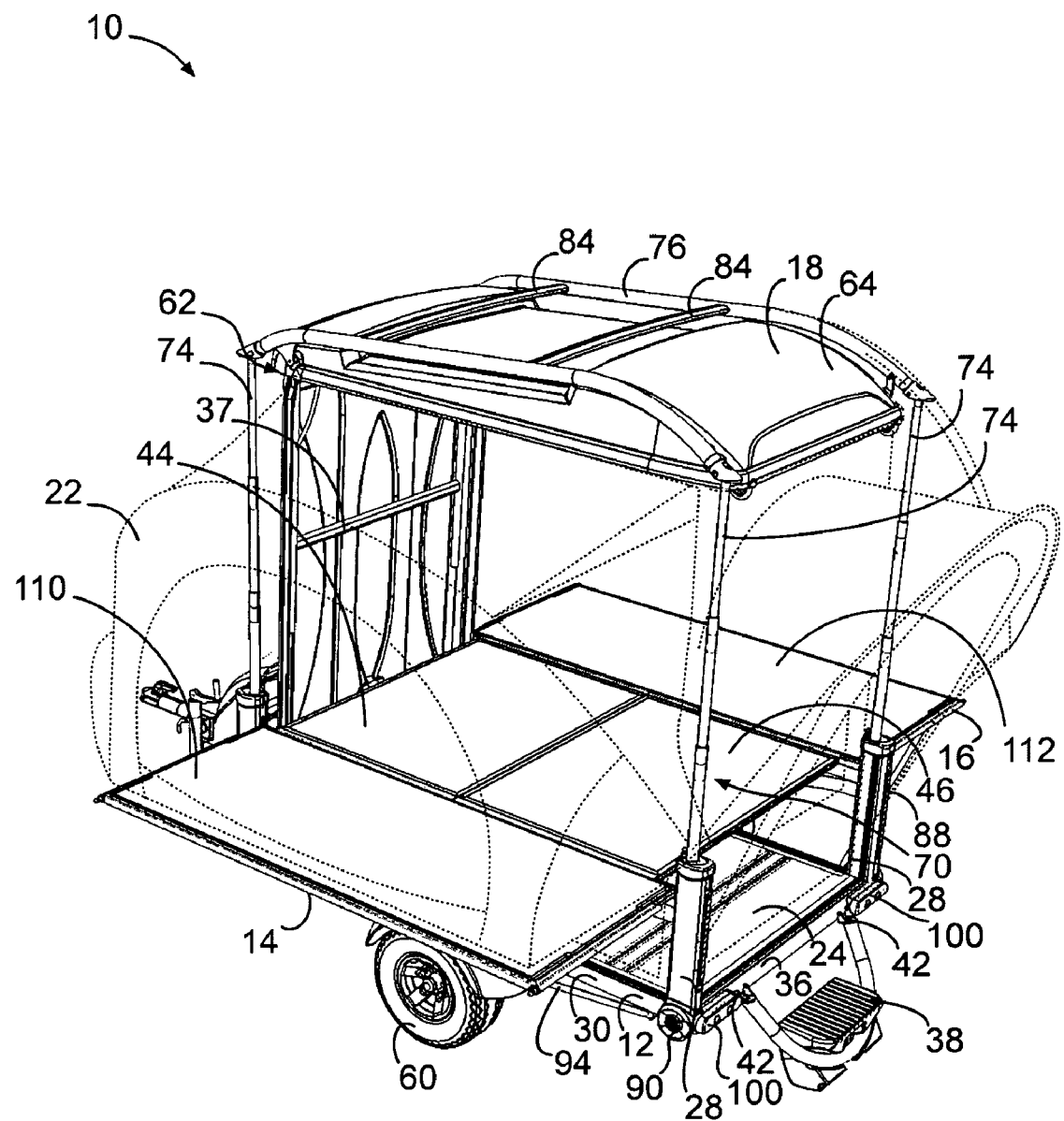
FIG. 20 is a perspective view of the interior of a tent formed by the travel trailer when in the camping configuration in accordance with one exemplary embodiment.

FIG. 20 shows the interior 70 of tent 22. Tent fabric 20 is positioned over the first and second bed platforms 14 and 16 in order to increase the volume of interior 70. The tent fabric 20 is stored in the camping pod 18 and is accessible when the bottom portion 62 of the camping pod 18 is unlatched and lowered. The tent fabric 20 is thus raised inside of the camping pod 18 and is not deployed while the camping pod 18 is elevated from the travel to the camping configuration. Once the camping pod 18 is raised to the elevated position, the tent fabric 20 is then exposed and lowered into position. As such, in the disclosed exemplary embodiment the tent fabric 20 is not deployed and raised into position upon raising of the camping pod 18 but is instead in a storage position during raising of the camping 18 and deployment thereof only begins once the camping pod 18 is in the vertically raised position.

The tent fabric 20 may be made of a variety of materials. Typically, the tent fabric 20 is made of a material that is strong, waterproof and flexible. In accordance with one exemplary embodiment, the tent fabric 20 is fabric provided by Kelty® having offices located at 6235 Lookout Road, Boulder, Colo., USA. The tent fabric 20 may be a polyester and cordura tent and awning as provided by Kelty®. Bed panels 110 and 112 can be placed onto the first and second bed platforms 14 and 16 in order to form beds onto which users may rest or sleep. The bed panels 110 and 112 can be stored in the camping pod 18 and may be removed and unfolded once the camping pod 18 is opened. The user may manually place the bed panels 110 and 112 into position in the first bed platform 14 and second bed platform 16. Air mattresses (not shown) can be inflated and located on top of the bed panels 110 and 112 to provide a comfortable sleeping support for the users. The bed panels 110 and 112 may be made from corrugated plastic panels that are inserted into polyester fabric sleeves. The corrugated plastic panels may be Coroplast® material provided by Piedmont Plastics®, having offices located at 25 Brookfield Oaks Drive # A, Greenville, S.C., USA. The polyester fabric sleeves may be provided from Kelty®. Alternatively, the bed panels 110 and 112 can be stored at another location in the travel trailer 10 and placed onto the bed platforms 14 and 16 when constructing the tent 22. For example, the bed panels 110 and 112 can be located underneath the camping pod 18 and can be removed from this location and placed onto the bed platforms 14 and 16 before the camping pod 18 is opened. Although not shown, windows can be located in the tent fabric 20 to allow viewing out of the front side of the tent 22. Additionally or alternatively, one or more windows may be located in the tent fabric 20 above the first and second bed platforms 14 and 16 to allow a user to gaze at the stars while resting on the bed platforms 14 and 16.

A pair of interior bed panels 44 and 46 can also be included. The interior bed panels 44 and 46 may be located inside of the camping pod 18 and can be mounted to the top portion 64. The interior bed panels 44 and 46 may be accessed when the camping pod 18 is opened and can be detached from the top portion 64. The interior bed panels 44 and 46 can alternatively be located underneath the camping pod 18 when the travel trailer 10 is in the travel or transport configurations. In the camping mode, the interior bed panels 44 and 46 can be detached from the rack 76, camping pod 18, or other member to which they are attached and placed into a desired position, for instance between the bed panels 110 and 112. The interior bed panels 44 and 46 can be located above the floor 24 of the travel trailer 10 at the same height as the bed panels 110 and 112 to form a single, large sleeping surface. The interior bed panels 44 and 46 can have a thickness of one inch and may have a Kraft Paper® corrugated honeycomb core with a Filon® skin. The Filon® skin can be white on one side and have a pebble composition on its opposite side. Such interior bed panels 44 and 46 can be provided by CCV having offices at 8775 C Jim Bailey Cres., Kelowna, British Columbia, Canada. The interior bed panels 44 and 46 composed of this configuration afford a strong, yet lightweight component of the travel trailer 10.

The bed panels 44 and 46 can alternatively be located above the floor 24 at a height greater than the bed panels 110 and 112 in order to form a table. In this regard, users may sit on the bed panels 110 and 112 and use bed panels 44 and 46 as a table surface for eating or playing cards. Ends of the bed panels 44 and 46 can hook onto or otherwise be supported by a front frame component 37 of the frame 12. In this regard, the bed panels 44 and 46 can have flanges on their ends that fit onto the ends of the first bed platform 14 and the second bed platform 16. The flanges of the bed panels 44 and 46 will thus rest on the horizontally disposed bed platforms 14 and 16 and on tent fabric 20 located at this point of attachment. Legs can be provided on the underside of the bed panels 44 and 46 in order to be supported along their length. Further, the sides of the bed panels 44 and 46 can be supported by the first and second side frame components 30 and 32 or may be supported by portions of the frame 12. The bed panels 44 and 46 can be adjusted and positioned in a variety of manners, as desired, in order to selectively arrange the interior 70 of the tent 22.

The tent fabric 20 can be supported by the frame 12. In this regard, the tent fabric 20 may be attached to the frame 12 or may be unattached to the frame 12 which still supports the tent fabric 20 since it supports the camping pod 18 and/or telescoping members 74 which in turn support the tent fabric 20. As such, the frame 12 supports the tent fabric 20 in that it functions to hold the tent fabric 20 in a particular position. As such, when used herein the support that the frame 12 provides to the tent fabric 20 is understood to be used in the broadest sense and does not require actual contact, locking, covering or overlapping of these components. The travel trailer 10 may include components that are made of a variety of materials. For example, the rack 76 may be made of aluminum in accordance with one exemplary embodiment. Additionally, bed platforms 14 and 16, the side frame components 30 and 32, the vertical corner posts 28, and the rear cross-member 36 may also be made of aluminum. The yoke 34 and hitch 48 can be made of steel in accordance with certain exemplary embodiments.

Figure 21:
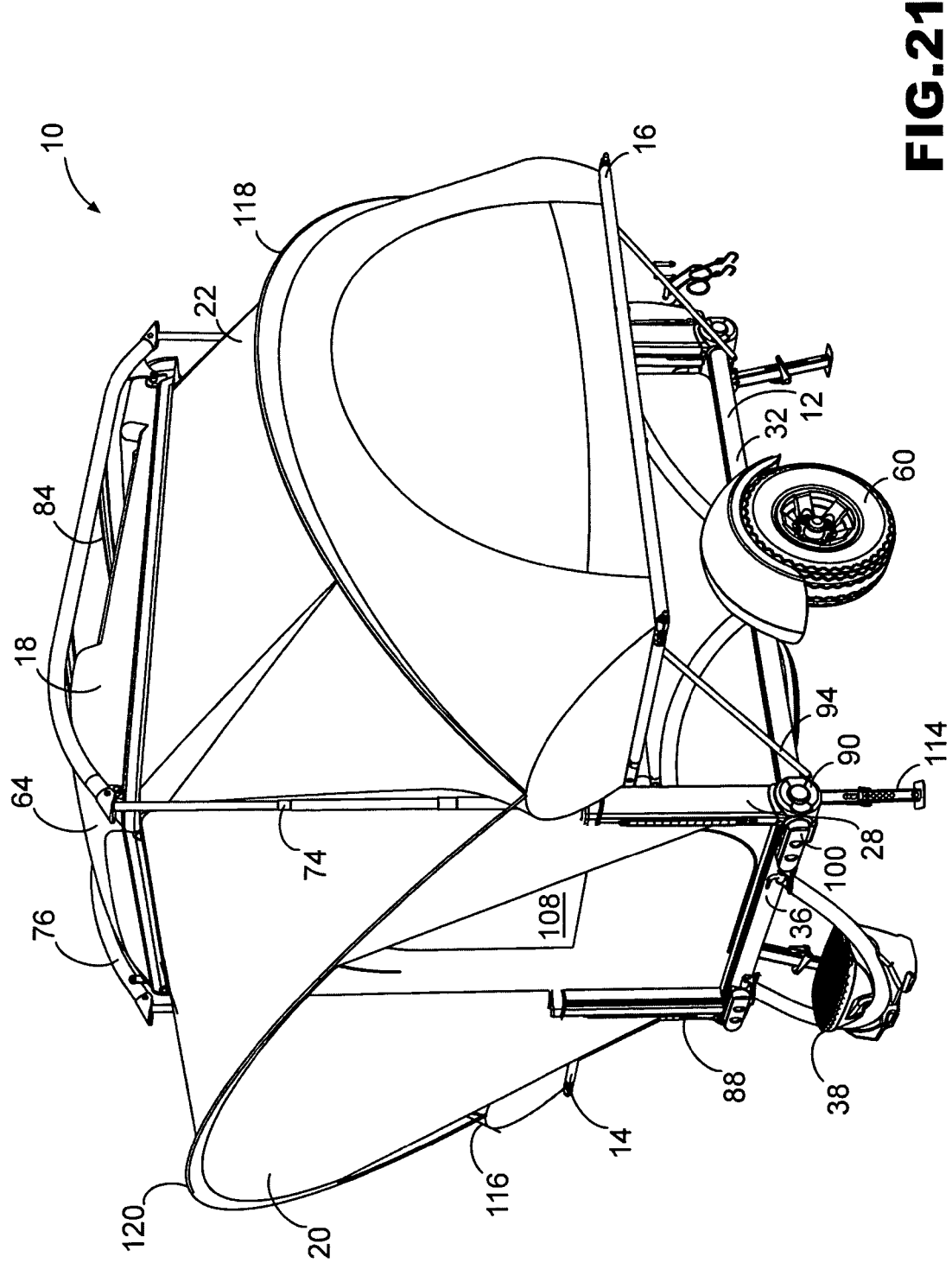
FIG. 21 is a perspective view of the exterior of a tent formed by the travel trailer when in the camping configuration in accordance with another exemplary embodiment.

An alternative exemplary embodiment of the travel trailer 10 is shown in FIG. 21. The frame 12 can include one or more legs 114 that are deployed when the travel trailer 10 is placed into the camping configuration. The legs 114 are bolted onto the bottom of the frame 12 and can be capable of pivoting and being positioned upon the ground as desired in order to help provide stability to the tent 22. The legs 114 may be Atwood® Stabilizer Jacks provided by Atwood® Mobile Products having offices at 1120 North Main Street, Elkhart, Ind., USA. Four legs 114 are illustrated. However, it is to be understood that any number of legs 114 may be used in accordance with various exemplary embodiments. The legs 114 may be attached to the cross members of the floor 24 of the frame 12 in certain exemplary embodiments. However, other embodiments are possible in which the legs 114 are either bolted or welded onto the side frame components 30 and 32 or onto other portions of the frame 12.

Opening of the camping pod 18 allows tent fabric 20 to be deployed. The tent fabric is attached to the top portion 64 of the camping pod 18 and is removed therefrom and placed into position with respect to the first and second bed platforms 14 and 16 and the rear of the frame 12. Tent poles 116, 118 and 120 may be stored in the camping pod 18 or in front storage box 82. The tent poles 116, 118 and 120 are elongated members capable of bending to some degree. The tent poles 116, 118 and 120 may be made of aluminum in accordance with certain exemplary embodiments. The tent poles 116, 118 and 120 may be DAC® tent poles provided by Dongah Aluminum Corporation having offices at 542-3 Gajwa-dong, Suh Ku, Incheon, Korea. The user can insert the tent pole 116 into a receiving pocket defined within the tent fabric 20. The tent pole 116 may have ends that are cylindrical in shape and are received within circular apertures defined in flanges of the tent fabric 20. Tent pole 116 functions to provide structural support to, and shape, the portion of the tent 22 located above the first bed platform 14. In a similar manner, tent pole 118 can be inserted into a pocket of the tent fabric 20 in order to shape the portion of tent 22 located above the second bed platform 16. Tent pole 120 can be likewise inserted into a pocket of the tent fabric 20 located at the rear of the tent 22. Tent pole 120 functions to help define and support an awning that is formed in the tent 22 at a location above the door 108 of the tent 22.

The camping configuration of the travel trailer 10 reveals a tent 22 that has a wall that is at least partially formed by the bottom portion 62 of the camping pod 18. The front wall of the tent 22 is formed partially by the bottom portion 62 of the camping pod 18 and partially by a front section of the tent fabric 20. At least a portion of the roof of the tent 22 is formed by the top portion 64 of the camping pod 18. Specifically, the portion of the roof located above the floor 24 is formed by the top portion 64 of the camping pod 18, and the remaining portions of the roof of the tent 22 are formed by tent fabric 20.

Figure 22B:
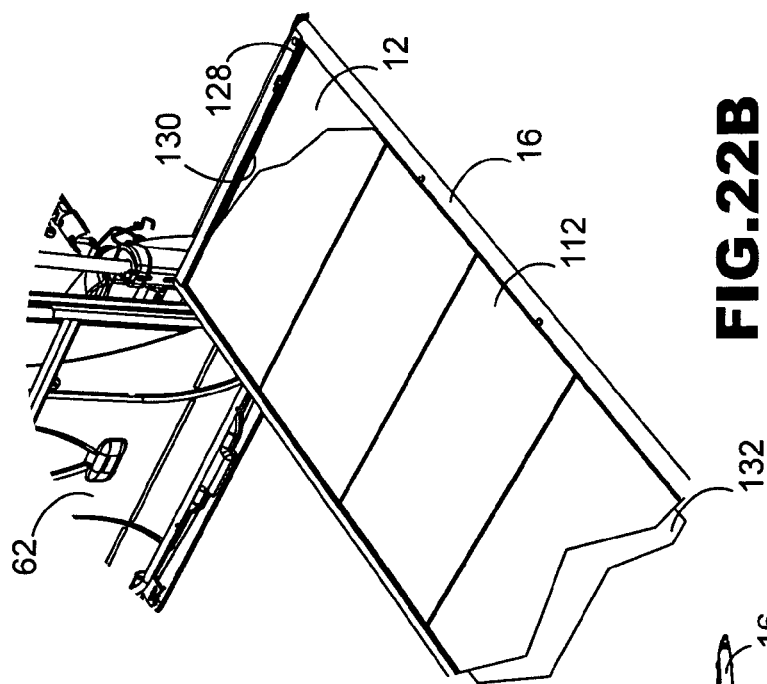
FIG. 22B is a partial perspective view that illustrates the bed panel of FIG. 22A.
Figure 22A:
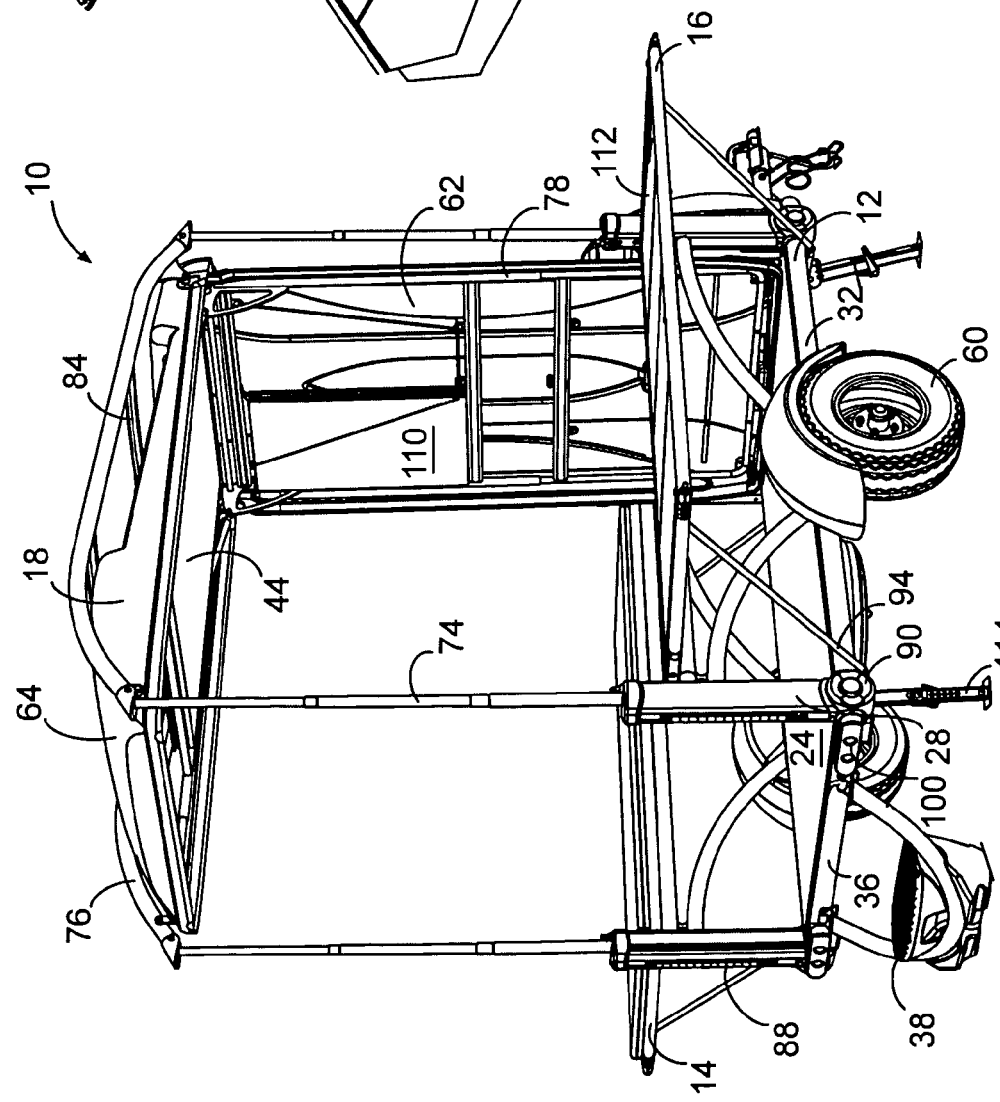
FIG. 22A is a perspective view of the travel trailer of FIG. 21 that illustrates interior features of the tent.
Figure 23B:
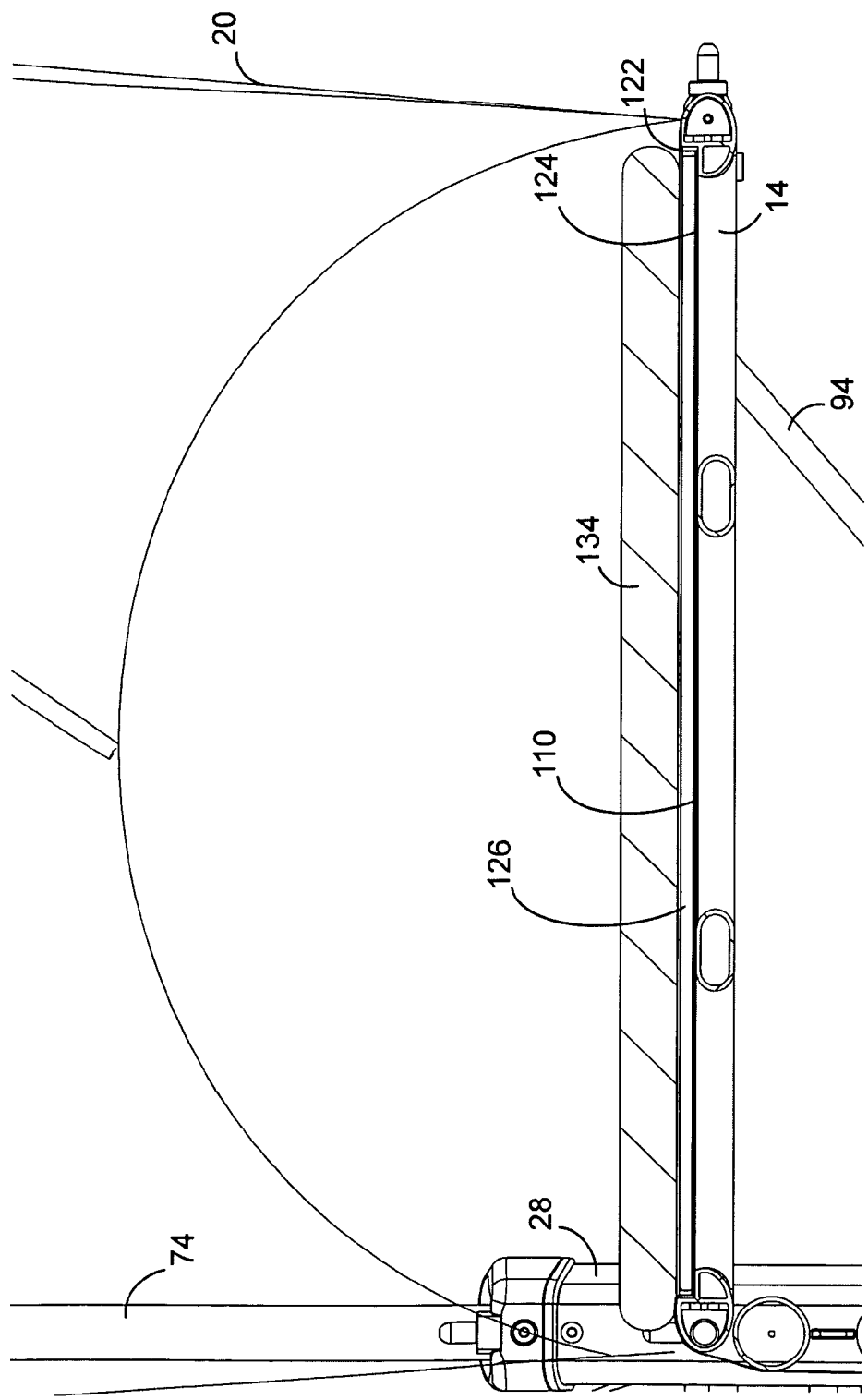
FIG. 23B is a cross-sectional view of one of the bed panels of the travel trailer of FIG. 23A.

With reference now to FIGS. 22A, 22B, 23A and 23B, the open bottom portion 62 of the camping pod 18 holds a pair of folded bed panels 110 and 112. The bed panels 110 and 112 have corrugated plastic panels that may be contained within pockets of the polyester fabric sleeves that are attached to one another. The bed panels 110 and 112 can be folded four times onto one another for space conservation. A hook and loop type fastener strap may be used to retain the folded bed panels 110 and 112 onto the bottom portion 62. FIG. 22A shows the bed panel 112 retained in this manner. The user may remove the bed panel 110 from the bottom portion 62 and unfold the bed panel 110. The first bed platform 14 has a ledge 122 that defines a recess 124. Portions of the tent fabric 20 are located within the recess 124 when the tent fabric 20 is deployed and opened up over the first bed platform 14. This portion of the tent fabric 20 has sleeves 126 that are sized to receive the ends of the bed panel 110 in order to retain the bed panel 110 therein and to function to secure the positioning of the tent 22. The sleeved bed panel 110 can then be located into the recess 124 of the first bed platform 14. With reference now to FIG. 22B, the second bed platform 16 has a ledge 128 that defines a recess 130. A portion of the tent fabric 20 located at the second bed platform 16 has a sleeve 132 that can receive the unfolded bed platform 112 that is placed into the recess 130 with portions of tent fabric 20 held therebetween. The user may retrieve and inflate two of the air mattresses 134 from the camping pod 18 and place these air mattresses 134 onto the bed panels 110 and 112 to provide for a sleeping area in the travel trailer 10. The air mattresses 134 are stored and held in the top portion 64 of the camping pod 18 when not in use.

A pair of interior bed panels 44 and 46 are retained in the top portion 64 of the opened camping pod 18. The interior bed panels 44 and 46 can rest on cross members of the rack 76 and can be removed by sliding the interior bed panels 44 and 46 through openings between the cross members. Other arrangements are possible in which the interior bed panels 44 and 46 are bolted to or otherwise fixedly attached to the rack 76. The interior bed panel 44 can have a hook located on one end that is hooked onto a cross member of the lowered bottom portion 62 of the camping pod 18. FIG. 23A illustrates the interior bed panel 44 as positioned for use as a table in the interior 70 of the tent 22. A support tie 136 may be included that has hooks on either end that attach to a ring on the interior bed panel 44 and to a ring on the bottom portion 62. The support tie 136 functions to support the interior bed panel 44 in position when used as a table. The support tie 136 may be made of a flexible plastic material in accordance with certain exemplary embodiments. The interior bed panel 44 thus affords users of the travel trailer 10 with an eating surface that can be utilized while sitting on the bed panels 110 and 112.

Both of the interior bed panels 44 and 46 may have hooks located on their ends that can be placed onto the ends of the first bed platform 14 and second bed platform 16. The interior bed panels 44 and 46 can thus bridge the area between the bed panels 110 and 112 to form one large surface, as shown for instance in FIG. 20. The remaining air mattresses 134 can be removed and inflated and placed onto the interior bed panels 44 and 46 so that a larger sleeping area can be realized. The air mattresses 134 may be provided by Pacific Outdoor Equipment having offices located at 521 East Peach Street, Unit 4, Bozeman, Mont., USA. As shown, a space remains underneath the assembled interior bed panels 44 and 46 that is defined at least partially by the floor 24 and other portions of the tent fabric 20. This space may be utilized as an additional sleeping area or may be used for storage of equipment or other items during use of the travel trailer 10 in the camping configuration.

Figure 24:
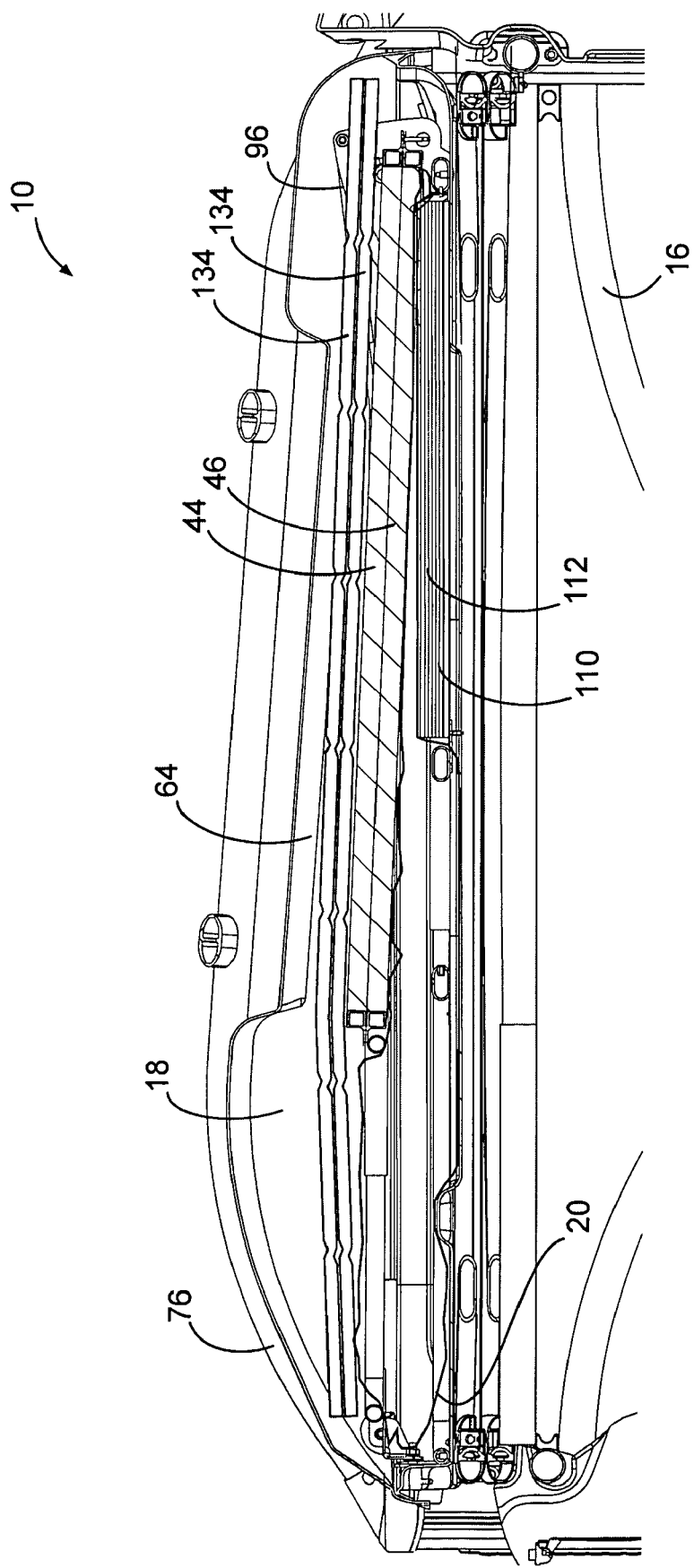
FIG. 24 is a cross-sectional view of the camping pod that shows the orientation of various components stored therein.
Figure 25:
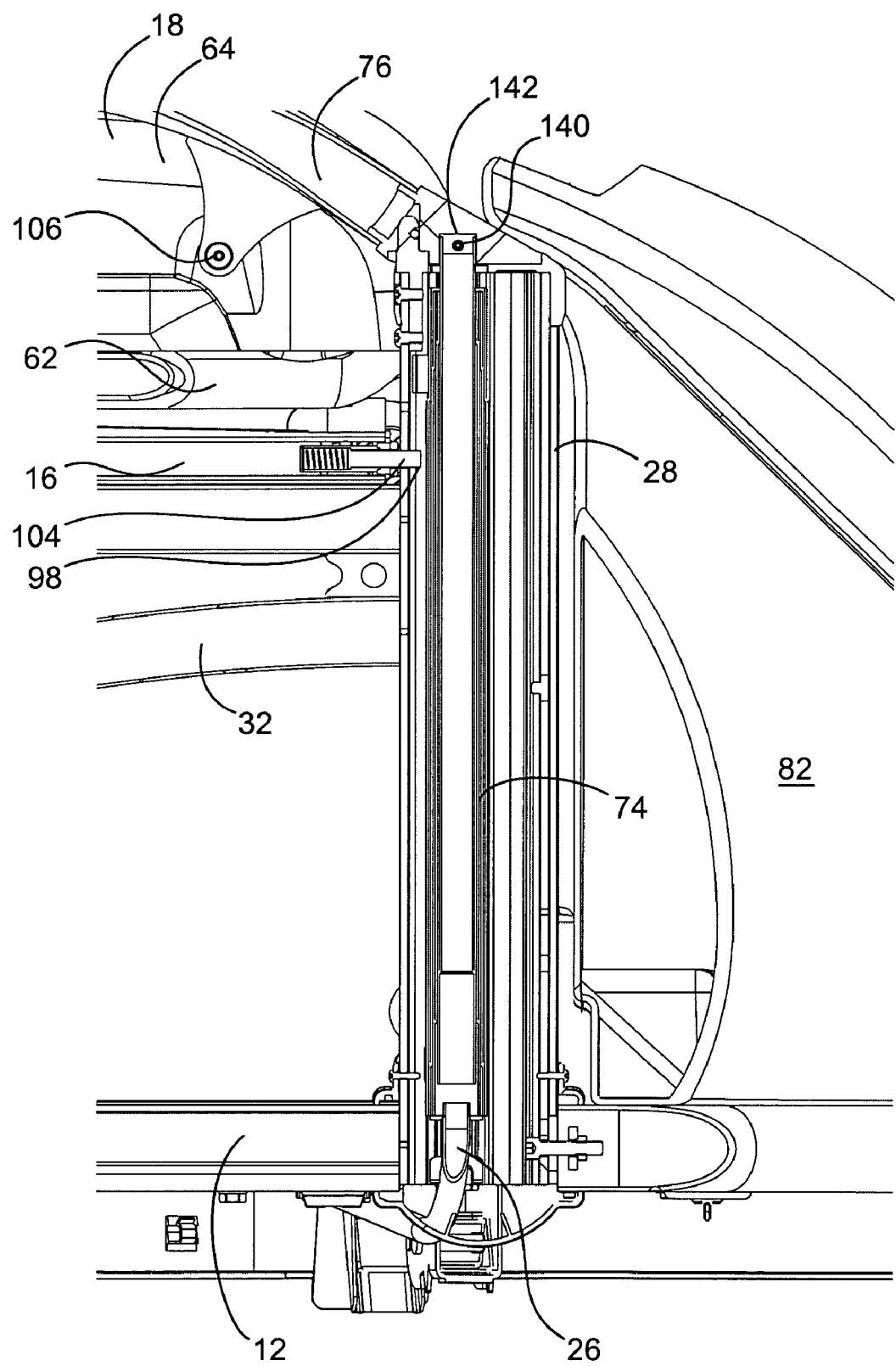
FIG. 25 is a cross-sectional view of the telescoping member in the retracted position in accordance with one exemplary embodiment.
Figure 26:
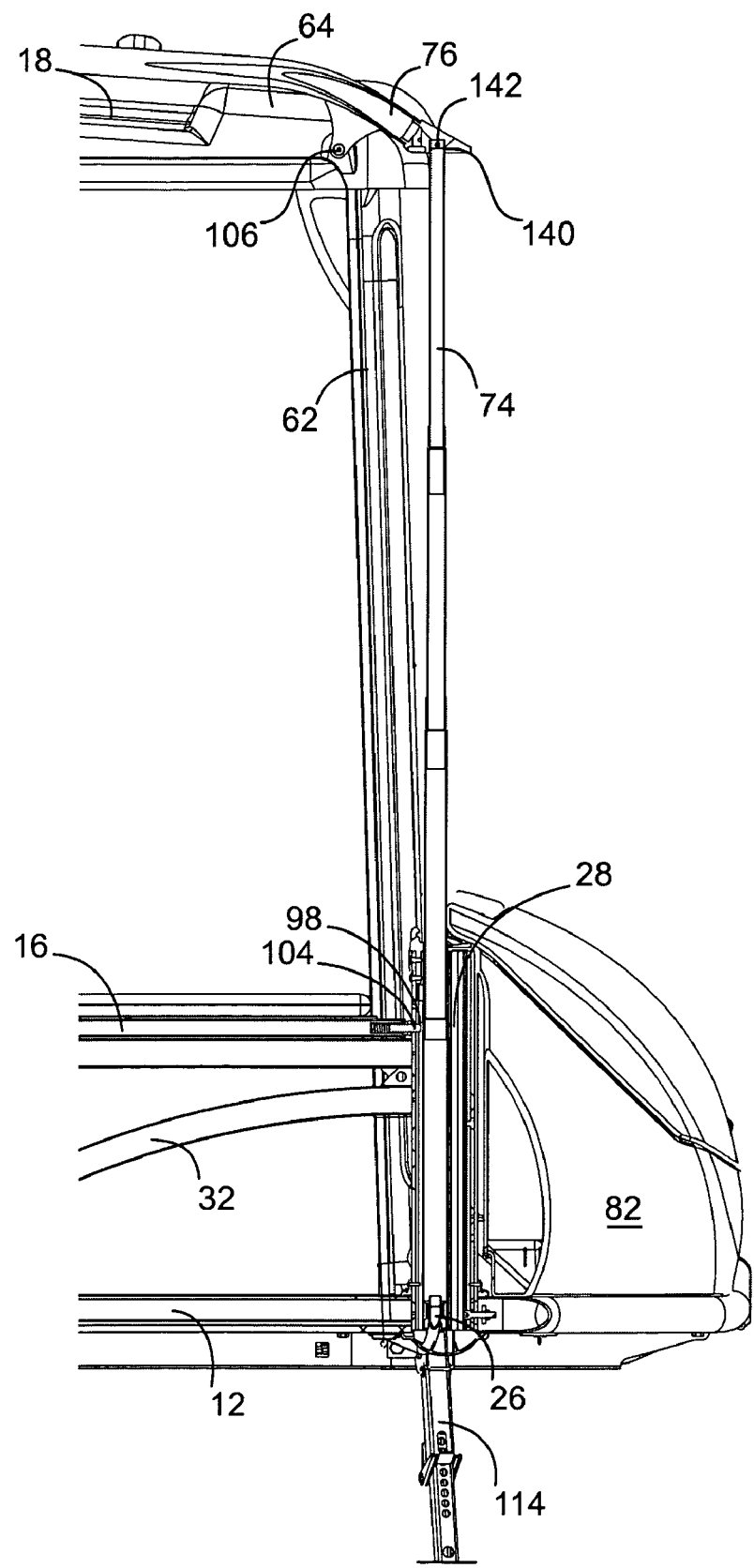
FIG. 26 is a cross-sectional view of the telescoping member of FIG. 25 in the extended position.

FIG. 24 shows a cross-sectional view of the camping pod 18 in the closed position. The bed panels 110 and 112 are located at the bottom of the camping pod 18 and are retained onto the bottom portion 62 by hook and loop type fastener straps or by another attachment mechanism. Tent fabric 20 is located above the bed panels 110 and 112 and is compressed into a relatively small space due to its inherent flexibility. The interior bed panels 44 and 46 are located above the tent fabric 20 and engage cross members of the rack 76 located within the camping pod 18. Movement of the travel trailer 10 during transport will necessarily cause disturbances and vibration within the camping pod 18. The air mattresses 134 can be positioned within the camping pod 18 to act as a cushioning device so as to prevent movement and vibration of the components within. In this regard, the air mattresses 134 may be placed above the interior bed panels 44 and 46 in order to prevent same from rattling against the cross members of the rack 76. The air mattresses 134 can be positioned to fill up any empty space within the camping pod 18 so that the elements housed within are cushioned to prevent vibration during transport. Although shown as being arranged in a particular configuration, it is to be understood that the bed panels 110 and 112, the tent fabric 20, the interior bed panels 44 and 46, and the air mattresses 134 can be arranged in various configurations within the camping pod 18 in accordance with other exemplary embodiments.

An alternative exemplary embodiment of the lifting portions of the travel trailer 10 are shown in FIGS. 25, 26, 27A and 27B that are cross-sectional views of the vertical corner posts 28, telescoping member 74 and related components. The telescoping member 74 is a single piece made of four cylindrical tubes that are co-axial with one another. Each of the cylindrical tubes of the telescoping member 74 has a different diameter so that they are capable of being retained and extended in a telescoping manner. Each one of the cylindrical tubes can be a single piece that has a smaller diameter at the top and a larger diameter at the bottom than the diameter of the middle section of the single piece. In this manner, the four cylindrical pieces can be arranged so that they are capable of pulling a successive cylindrical piece upwards upon lifting of the telescoping member 74. The successive tubes of the telescoping member 74 can slide relative to one another such that when the lifting mechanism 26 is actuated the tubes are lifted in order from the center out. The centermost tube is lifted first its full then at such time the next successive outward tube is pulled by the centermost tube upwards. This process repeats itself until all of the cylindrical tubes of the telescoping member 74 are fully extended. The bottom cylindrical tube may have a knurl feature applied thereon so as to inform the user that the maximum height of the telescoping member 74 has been reached and to cease actuation of the lifting mechanism 26. Reversal of the lifting mechanism 26 causes the cylindrical tubes to retract in a reverse manner.

Figure 27A:
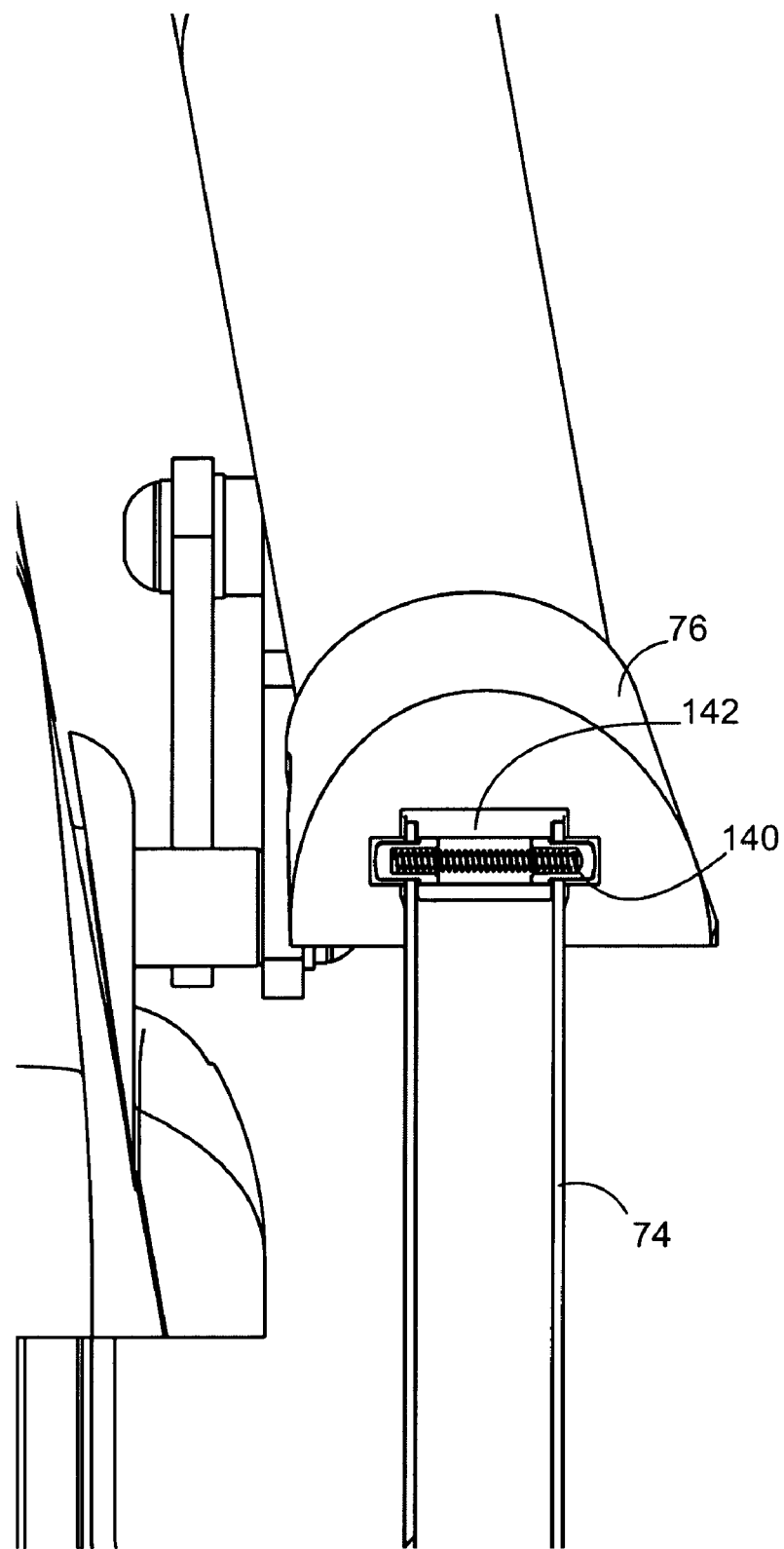
FIG. 27A is a cross-sectional view that shows the connection between the telescoping member and the rack in accordance with the exemplary embodiment shown in FIGS. 25 and 26.
Figure 27B:
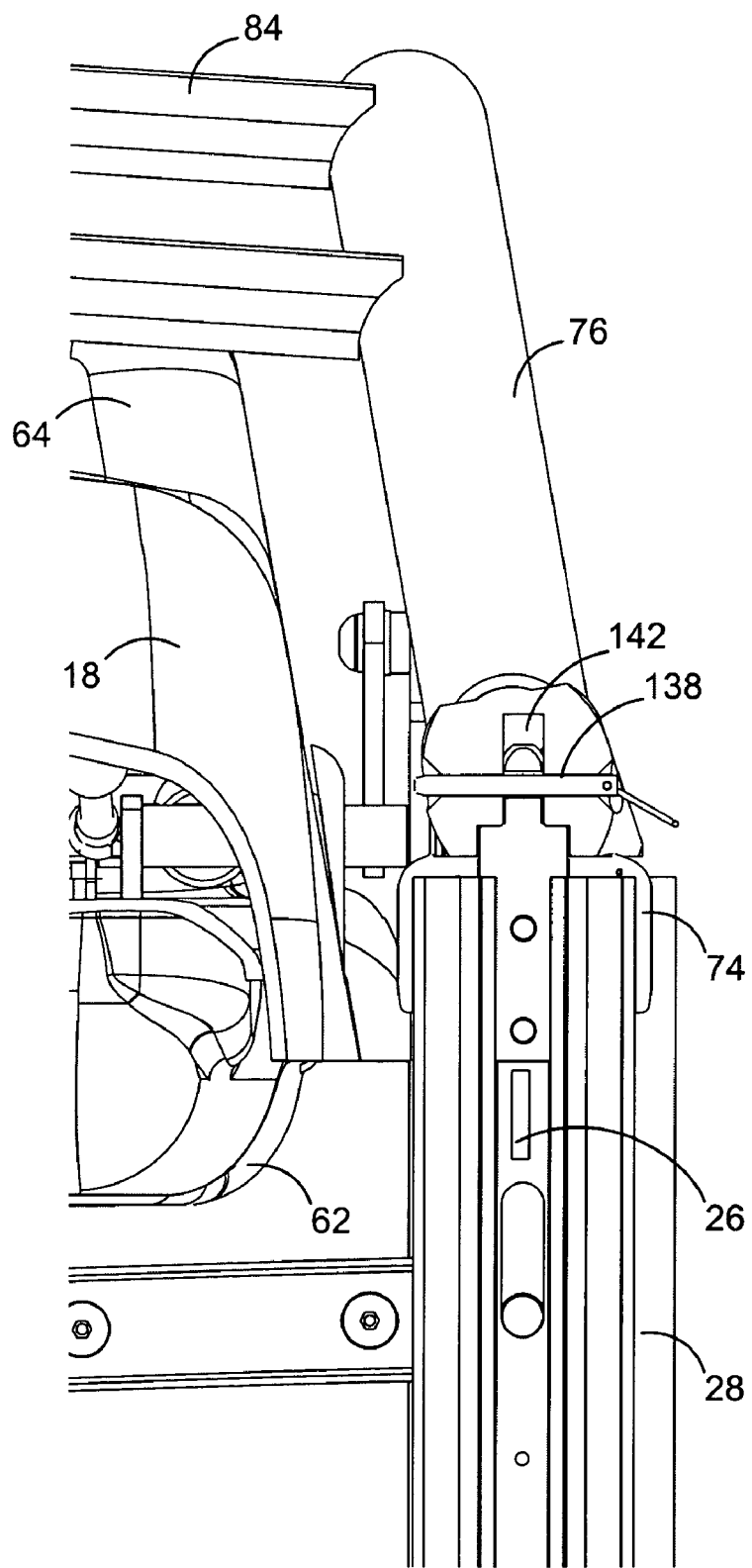
FIG. 27B is a cross-sectional view similar to FIG. 27A but taken along a different section of the connection to show additional features of the connection between the telescoping member and the rack.

A retractable pin 140 of the upper tube of the telescoping member 74 functions to hold the rack 76 to the telescoping member 74. In order to attach these two elements, the user may rotate the upper tube of the telescoping member 74 so that the retractable pin 140 is aligned with a grooved portion of the rack 76. Lowering of the rack 76 onto the retractable pin 140 causes the retractable pin 140 to move along the groove and be compressed so that it can be retained with a recess 142 of the rack 76. The upper tube of the telescoping member 74 can then be rotated inside of the recess 142 so that the retractable pin 140 is aligned with openings therein to become extended and hence lock the rack 76 to the telescoping member 74. A set pin 138 can subsequently be inserted in order to further lock the rack 76 to the telescoping member 74. The set pin 138 is illustrated in FIG. 27B.

In order to detach the rack 76 from the telescoping member 74, the user may first ensure that the rack 76 is positioned at a point that allows access to the upper tube of the telescoping member 74 by the user. Next, the user can remove the set pin 138 that functions to lock the rack 76 to the telescoping member 74. The user may then grasp the upper tube of the telescoping member 74 and rotate same so that the retractable pin 140 slides along the internal opening and becomes retracted within the recess 142. Next, downward force may be applied on the upper tube of the telescoping member 74 so that it becomes detached from the rack 76. When force is applied, the retractable pin 140 is in a retracted position and does not impede the relative vertical movement between the rack 76 and the telescoping member 74. The user may then repeat the immediately mentioned process at the other three telescoping members 74 in order to remove same from the rack 76. In this regard, all of the connections between the telescoping members 74 and the rack 76 are identical in configuration.

Figure 28:
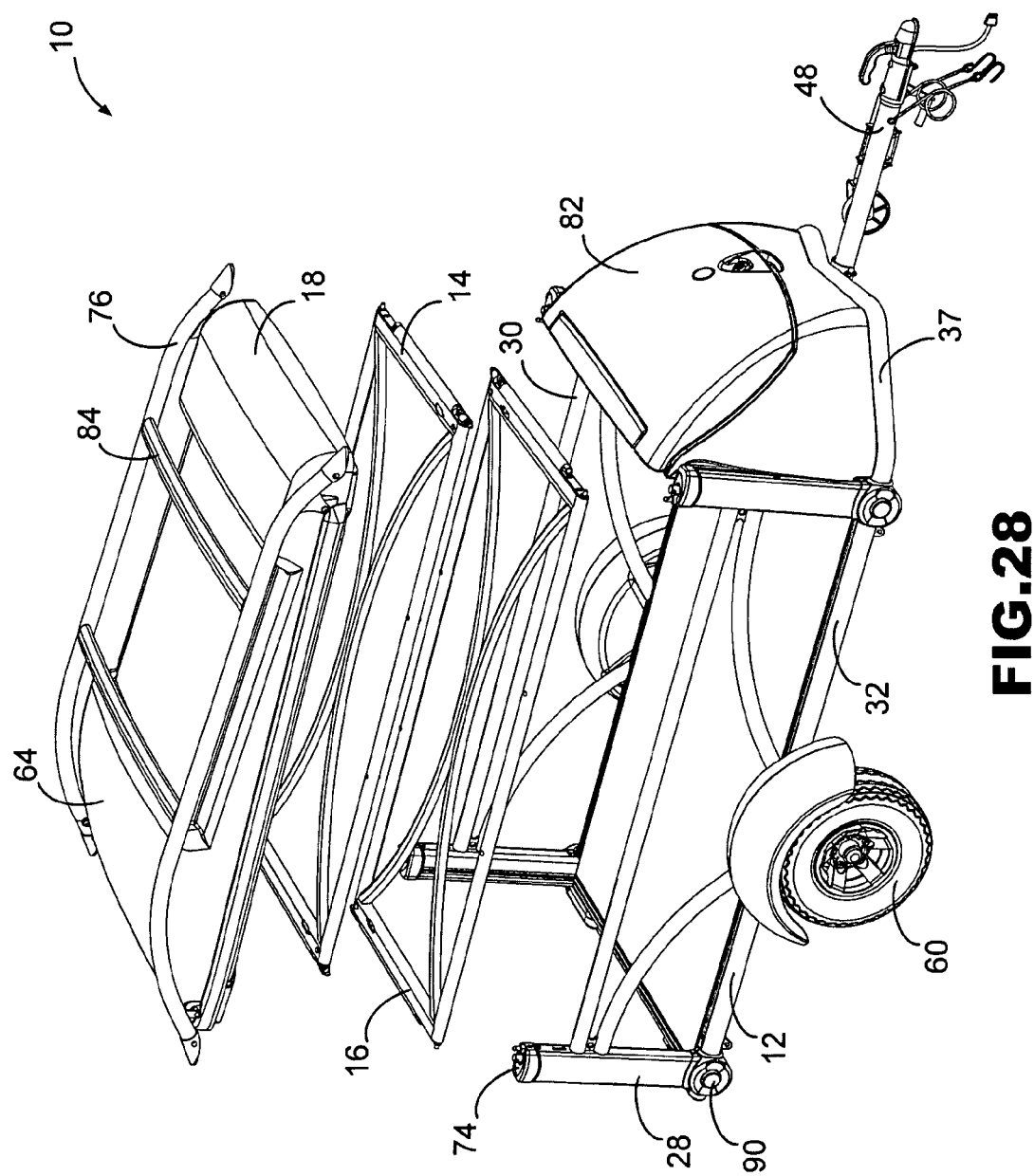
FIG. 28 is a perspective view of the travel trailer with the rack, camping pod, and bed panels removed.

FIG. 28 is a perspective view of the travel trailer 10 once the rack 76 has been removed. The camping pod 18 is likewise removed along with the rack 76 as it is attached thereto. Removal of the rack 76 causes the transport area 56 of the travel trailer 10 to be roofless to aid in inserting or transporting certain types of objects 58. For example, it may be desired to utilize the travel trailer 10 for the transport of yard waste. Removal of the rack 76 and camping pod 18 may aid in inserting, transporting and removing yard waste with the travel trailer 10. The step 38 may be optionally removed in this orientation so that the back of the travel trailer 10 can be more easily accessed and can allow objects longer than the travel trailer 10 to still be transported. The first bed platform and the second bed platform 14 and 16 can also be removed from the travel trailer 10 if desired should the travel trailer 10 be utilized as a utility trailer. The removal of the rack 76, camping pod 18, first bed platform 14 and second bed platform 16 can be effected without the need for the user to use tools in accordance with certain exemplary embodiments.

Figure 29:
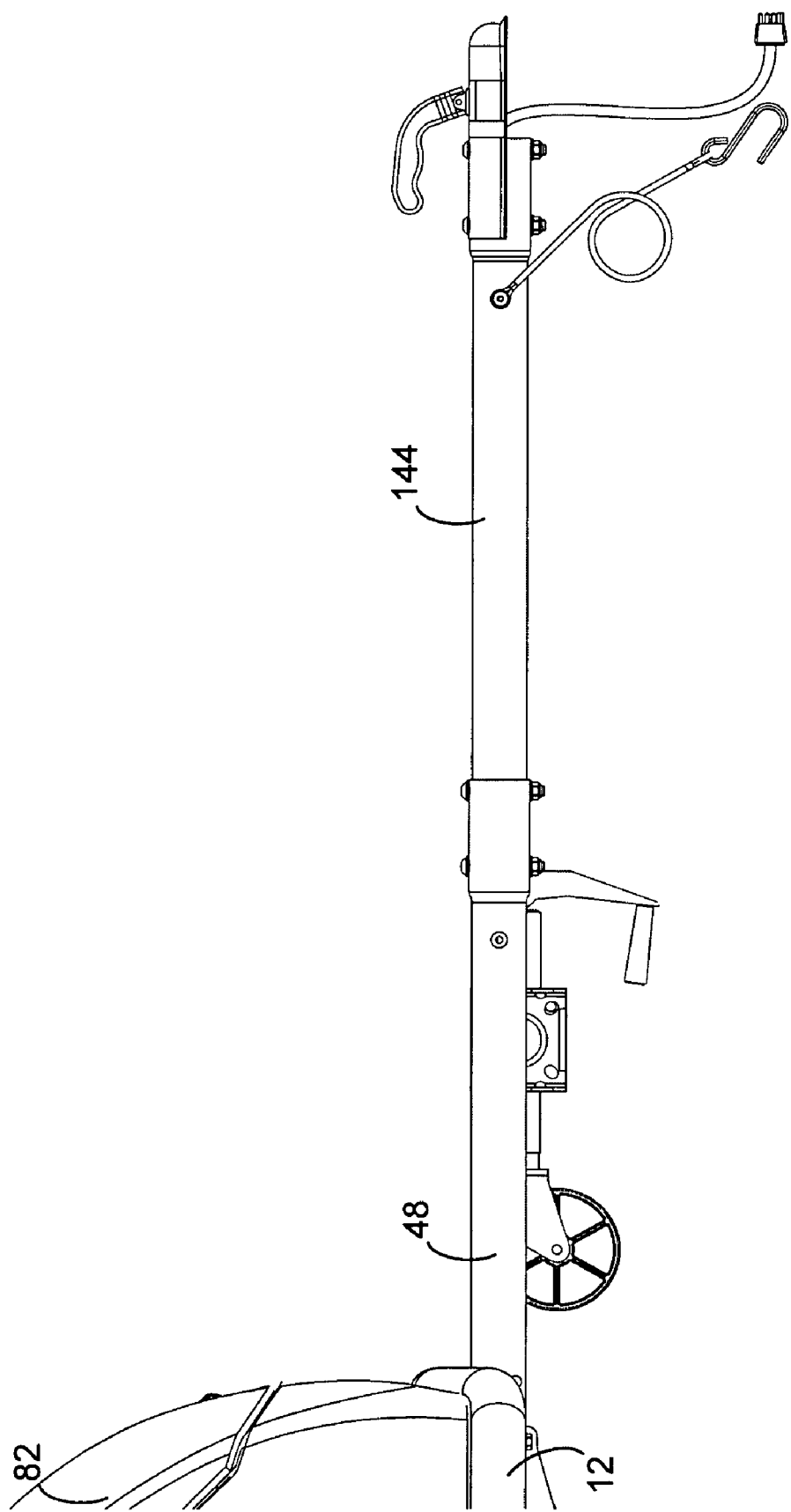
FIG. 29 is a side view that shows a tongue extension attached to the hitch in accordance with another exemplary embodiment.

FIG. 29 illustrates an alternative exemplary embodiment of the travel trailer 10. Here, a tongue extension 144 is bolted onto the hitch 48. The tongue extension 144 functions to increase the length of the hitch 48 so that the distance from the other portions of the travel trailer 10 to the towing vehicle is extended. It may be desirable in some circumstances to transport longer types of objects 58 such as kayaks. Placement of kayaks onto the rack 76 may require that the rack 76 be located farther from the towing vehicle in order to accommodate their length. The tongue extension 144 increases this distance so that objects 58 of longer length may be transported by the travel trailer 10. The tongue extension 144 may be a cast part and may be made of steel.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. A tent, comprising:
   a camping pod that has a clamshell configuration that has a closed position with a top portion and a bottom portion that are hinged to one another, the camping pod is moveable to an open position in which the bottom portion is pivoted with respect to the top portion to be moved downward to at least partially form a front wall of the tent and such that the top portion remains so as to at least partially form a top of the tent; and
   tent fabric that at least partially forms at least two walls of the tent.

2. The tent as set forth in claim 1, further comprising:
   a frame that supports the camping pod;
   at least one tent pole that is positioned through a portion of the tent fabric in order to shape the tent; and
   a leg that is attached to the frame and is capable of being positioned against the ground in order to stabilize the frame.

3. The tent as set forth in claim 1, further comprising a pair of interior bed panels, wherein the camping pod is configured in a clam shell orientation and is capable of being opened such that the bottom portions of the camping pod at least partially forms the wall of the tent, and wherein at least one of the interior bed panels is configured for being attached to the bottom of the camping pod so as to be horizontally oriented for use as a table within the interior of the tent.

4. The tent as set forth in claim 1, further comprising:
   a frame that supports the camping pod and the tent fabric; and
   a pair of wheels rotatably mounted to the frame, wherein both of the wheels have an aluminum hub.

5. The tent as set forth in claim 1, further comprising:
   a frame that supports the camping pod and the tent fabric;
   a hitch that is attached to the frame and is configured for being attached to a vehicle for use in towing the tent; and
   a tongue extension that is configured for being bolted to the hitch, wherein the tongue extension is configured for being attached to the vehicle such that the hitch is attached to the vehicle for use in towing the tent, wherein the tongue extension functions to extend the distance between the camping pod and the vehicle.

6. The tent as set forth in claim 1, further comprising:
   a hitch configured for attachment to a vehicle; and
   a hinge connection configured to allow the angular orientation between the camping pod and the hitch to change while the hitch is attached to the vehicle.

\* \* \* \* \*